(12) United States Patent
Yun

(10) Patent No.: US 12,513,366 B2
(45) Date of Patent: Dec. 30, 2025

(54) ELECTRONIC APPARATUS AND CONTROLLING METHOD THEREOF

(71) Applicant: SAMSUNG ELECTRONICS CO., LTD., Suwon-si (KR)

(72) Inventor: Byoungho Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 18/600,027

(22) Filed: Mar. 8, 2024

(65) Prior Publication Data

US 2024/0397160 A1  Nov. 28, 2024

Related U.S. Application Data

(63) Continuation of application No. PCT/KR2024/001904, filed on Feb. 8, 2024.

(30) Foreign Application Priority Data

May 23, 2023  (KR) .......................... 10-2023-0066561
Sep. 6, 2023   (KR) .......................... 10-2023-0118569

(51) Int. Cl.
  H04N 21/4788  (2011.01)
(52) U.S. Cl.
  CPC .............................. H04N 21/4788 (2013.01)
(58) Field of Classification Search
  CPC ......... H04N 21/4788; H04N 21/43076; H04N 21/632; H04N 21/845; H04N 21/2665; H04N 21/26283; H04N 21/242; H04N 21/4668
  USPC .......................................................... 725/32
  See application file for complete search history.

(56) References Cited

U.S. PATENT DOCUMENTS

| | | | | |
|---|---|---|---|---|
| 5,828,839 | A | * | 10/1998 | Moncreiff ........... H04L 12/1818 709/204 |
| 7,143,428 | B1 | * | 11/2006 | Bruck ................ H04N 21/6175 709/204 |
| 7,743,096 | B2 | | 6/2010 | Bouilloux-Lafont et al. |
| 7,962,163 | B2 | | 6/2011 | Tsuchiyama |

(Continued)

FOREIGN PATENT DOCUMENTS

| | | | |
|---|---|---|---|
| JP | 2002-290949 B1 | | 10/2002 |
| JP | 2002300491 A | * | 10/2002 |

(Continued)

OTHER PUBLICATIONS

International Search Report (PCT/ISA/210) issued on May 22, 2024 by the International Searching Authority in International Application No. PCT/KR2024/001904.

(Continued)

Primary Examiner — Cynthia M Fogg
(74) Attorney, Agent, or Firm — Sughrue Mion, PLLC

(57) ABSTRACT

An electronic apparatus may include: at least one memory storing instructions; and at least one processor operatively connected to the at least one memory. The at least one processor may be configured to execute the instructions to: acquire a plurality of broadcast schedule information of different time zones; identify a plurality of broadcast times in which target content is broadcast among the plurality of broadcast schedule information; and provide a chat service for the target content during a target time period including the plurality of broadcast times.

20 Claims, 33 Drawing Sheets

(56) References Cited

U.S. PATENT DOCUMENTS

| | | | |
|---|---|---|---|
| 11,425,467 B2 | 8/2022 | Wee | |
| 2007/0168447 A1* | 7/2007 | Chen | G06Q 10/107 709/207 |
| 2012/0079067 A1* | 3/2012 | Stout | H04L 65/1083 709/217 |
| 2012/0174157 A1* | 7/2012 | Stinson, III | H04N 21/482 725/40 |
| 2013/0227086 A1* | 8/2013 | Stout | H04L 67/535 709/219 |
| 2014/0208367 A1* | 7/2014 | DeWeese | H04N 21/4223 725/61 |
| 2017/0366493 A1* | 12/2017 | Wilde | H04L 51/04 |
| 2022/0038783 A1 | 2/2022 | Wee | |
| 2023/0139264 A1* | 5/2023 | Panchaksharaiah | H04N 21/4788 725/32 |
| 2023/0147705 A1* | 5/2023 | Huertas | H04L 67/1095 709/248 |
| 2024/0048816 A1 | 2/2024 | Kim et al. | |

FOREIGN PATENT DOCUMENTS

| | | |
|---|---|---|
| JP | 3882605 B2 | 2/2007 |
| JP | 4696729 | 6/2011 |
| JP | 2013-258613 A | 12/2013 |
| KR | 10-0961544 B1 | 6/2010 |
| KR | 10-2011-0121257 A | 11/2011 |
| KR | 10-2013-0048015 A | 5/2013 |
| KR | 10-1667603 B1 | 10/2016 |
| KR | 10-1934965 B1 | 1/2019 |
| KR | 10-2259160 B1 | 5/2021 |
| KR | 10-2022-0016793 A | 2/2022 |
| KR | 10-2022-0159752 A | 12/2022 |

OTHER PUBLICATIONS

Written Opinion (PCT/ISA/237) issued on May 22, 2024 by the International Searching Authority in International Application No. PCT/KR2024/001904.

* cited by examiner

FIG. 10

| ITEM | Lineup ID | 0:00 UTC | 1:00 UTC | 2:00 UTC | 3:00 UTC | 4:00 UTC | 5:00 UTC | 6:00 UTC |
|---|---|---|---|---|---|---|---|---|
| FIRST TIME ZONE (UTC-0) | #01 | | | MOVIE | | | | |
| | #02 | | MOVIE | | | | | |
| | #03 | | MOVIE | | | | | |
| SECOND TIME ZONE (UTC-1) | #04 | | | | MOVIE | | | |
| | #05 | | | | MOVIE | | | |
| | #06 | | | | MOVIE | | | |
| THIRD TIME ZONE (UTC-2) | #07 | | | | | MOVIE | | |
| | #08 | | | | | MOVIE | | |
| | #09 | | | | | MOVIE | | |
| FOURTH TIME ZONE (UTC-3) | #10 | | | | | | MOVIE | |
| | #11 | | | | | | MOVIE | |
| | #12 | | | | | MOVIE | | |
| FIFTH TIME ZONE (UTC-4) | #13 | | | | | | | MOVIE |
| | #14 | | | | | | | MOVIE |
| | #15 | | | | | | | MOVIE |

CHAT ROOM t0 — 1:00 UTC
t1 — 6:00 UTC

1010

ELECTRONIC APPARATUS AND CONTROLLING METHOD THEREOF

CROSS-REFERENCE TO RELATED APPLICATION

This application is a bypass continuation of International Application No. PCT/KR2024/001904, filed on Feb. 8, 2024, which is based on and claims priority to Korean Patent Application No. 10-2023-0066561, filed on May 23, 2023 and Korean Patent Application No. 10-2023-0118569, filed on Sep. 6, 2023, in the Korean Intellectual Property Office, the disclosures of which are incorporated by reference herein in their entireties.

BACKGROUND

1. Field

Example embodiments of the disclosure relate to an electronic apparatus and a controlling method thereof. Specifically, they relate to an electronic apparatus which may provide a chat service (a chatting service) corresponding to content, and a controlling method thereof.

2. Description of Related Art

A chat service may be provided to each user watching content in various regions. For example, an online chat room may be provided where the plurality of users may simultaneously have a conversation with each other. The user may receive the chat service by accessing an internet address related to the chat room.

For the chat service, a manager is used to prepare a network environment related to the chat room in advance. The manager is used to prepare the generation time, end time, access right, access method, and other functions of the chat room in advance. The manager may provide the users with information related to the chat room and guide their access.

The manager is used to directly decide which content (or program) to provide the chat service for, and at what time to start/stop the chat service.

It is difficult for the manager to directly manage these matters because there are many companies (or business operators) that provide the content as well as various broadcast times of the content.

The manager may directly specify the content and then automatically acquire the broadcast time for each content. Even in this case, in case that the broadcast time is not unified, it may be inconvenient for the manager as the manager has to decide at what time to start/end the chat service.

SUMMARY

The disclosure provides an apparatus which may automatically determine target content and a target time for a chat service by analyzing a plurality of broadcast schedules, and a controlling method thereof.

According to an aspect of the disclosure, an electronic apparatus may include: at least one memory storing instructions; and at least one processor operatively connected to the at least one memory. The at least one processor may be configured to execute the instructions to: acquire a plurality of broadcast schedule information of different time zones; identify a plurality of broadcast times in which target content is broadcast among the plurality of broadcast schedule information; and provide a chat service for the target content during a target time period including the plurality of broadcast times.

The target content may be included a predetermined number of times or more in a plurality of content included in the plurality of broadcast schedule information.

The at least one processor may be further configured to execute the instructions to: identify the target content based on viewer rating information of the plurality of content that is included the predetermined number of times or more.

The at least one processor may be further configured to execute the instructions to: acquire first broadcast schedule information and second broadcast schedule information; acquire a first broadcast time corresponding to the target content from the first broadcast schedule information and a second broadcast time corresponding to the target content from the second broadcast schedule information; and provide the chat service for the target content during the target time period including the first broadcast time and the second broadcast time.

The least one processor may be further configured to execute the instructions to: acquire a first start time point and a first end time point, corresponding to the target content, based on the first broadcast time; acquire a second start time point and a second end time point, corresponding to the target content, based on the second broadcast time; and provide the chat service based on the first start time point, the first end time point, the second start time point, and the second end time point.

The at least one processor may be further configured to execute the instructions to: change each of the first start time point, the first end time point, the second start time point, and the second end time point to reference time points in a standard time system; acquire the target time period including all the reference time points; and provide the chat service during the target time period.

The electronic apparatus further may include: a communication interface. The at least one processor may be further configured to execute the instructions to: generate address information corresponding to the chat service based on the target time period; and transmit the address information corresponding to the chat service to a terminal device through the communication interface.

The at least one processor may be further configured to execute the instructions to: transmit information corresponding to a first screen related to the chat service to the terminal device through the communication interface; and based on receiving a user input from the terminal device, transmit information corresponding to a second screen, updated from the first screen according to the user input, to the terminal device through the communication interface.

The communication interface may include a first communication interface and a second communication interface. The at least one processor may be further configured to execute the instructions to: transmit the address information to a first terminal device through the first communication interface; and transmit the address information to a second terminal device through the second communication interface.

The electronic apparatus further may include a display. The at least one processor may be further configured to execute the instructions to: control the display to display a user interface (UI) related to the chat service output from the terminal device receiving the address information; and based on information corresponding to a user input being received from the terminal device, control the display to display the UI as changed according to the user input.

According to an aspect of the disclosure, a method of controlling an electronic apparatus, the method may include: acquiring a plurality of broadcast schedule information of different time zones; identifying a plurality of broadcast times in which target content is broadcast among the plurality of broadcast schedule information; and providing a chat service for the target content during a target time period including the plurality of broadcast times.

The target content may be included a predetermined number of times or more in a plurality of content included in the plurality of broadcast schedule information.

The method further may include: identifying the target content based on viewer rating information of the plurality of content that is included the predetermined number of times or more.

The method further may include: acquiring first broadcast schedule information and second broadcast schedule information. In the identifying of the plurality of broadcast times, a first broadcast time corresponding to the target content may be acquired from the first broadcast schedule information and a second broadcast time corresponding to the target content may be acquired from the second broadcast schedule information. In the providing of the chat service, the chat service for the target content may be provided during the target time period including the first broadcast time and the second broadcast time.

In the providing of the chat service: a first start time point and a first end time point, corresponding to the target content, may be acquired based on the first broadcast time; a second start time point and a second end time point, corresponding to the target content, may be acquired based on the second broadcast time; and the chat service may be provided based on the first start time point, the first end time point, the second start time point, and the second end time point.

In the providing of the chat service: each of the first start time point, the first end time point, the second start time point, and the second end time point may be changed to reference time points in a standard time system; the target time period including all the reference time points may be acquired; and the chat service may be provided during the target time period.

The method further may include: generating address information corresponding to the chat service based on the target time period; and transmitting the address information corresponding to the chat service to a terminal device.

The method further may include: transmitting information corresponding to a first screen related to the chat service to the terminal device; and based on receiving a user input from the terminal device, transmitting information corresponding to a second screen, updated from the first screen according to the user input, to the terminal device.

The method further may include: transmitting the address information to a first terminal device through a first communication interface; and transmitting the address information to a second terminal device through a second communication interface.

The method further may include: displaying a user interface (UI) related to the chat service output from the terminal device receiving the address information; and based on information corresponding to a user input being received from the terminal device, displaying the UI as changed according to the user input.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a view for explaining the operation of providing the chat service in consideration of the start time and end time of content;

DETAILED DESCRIPTION

Figure 1:
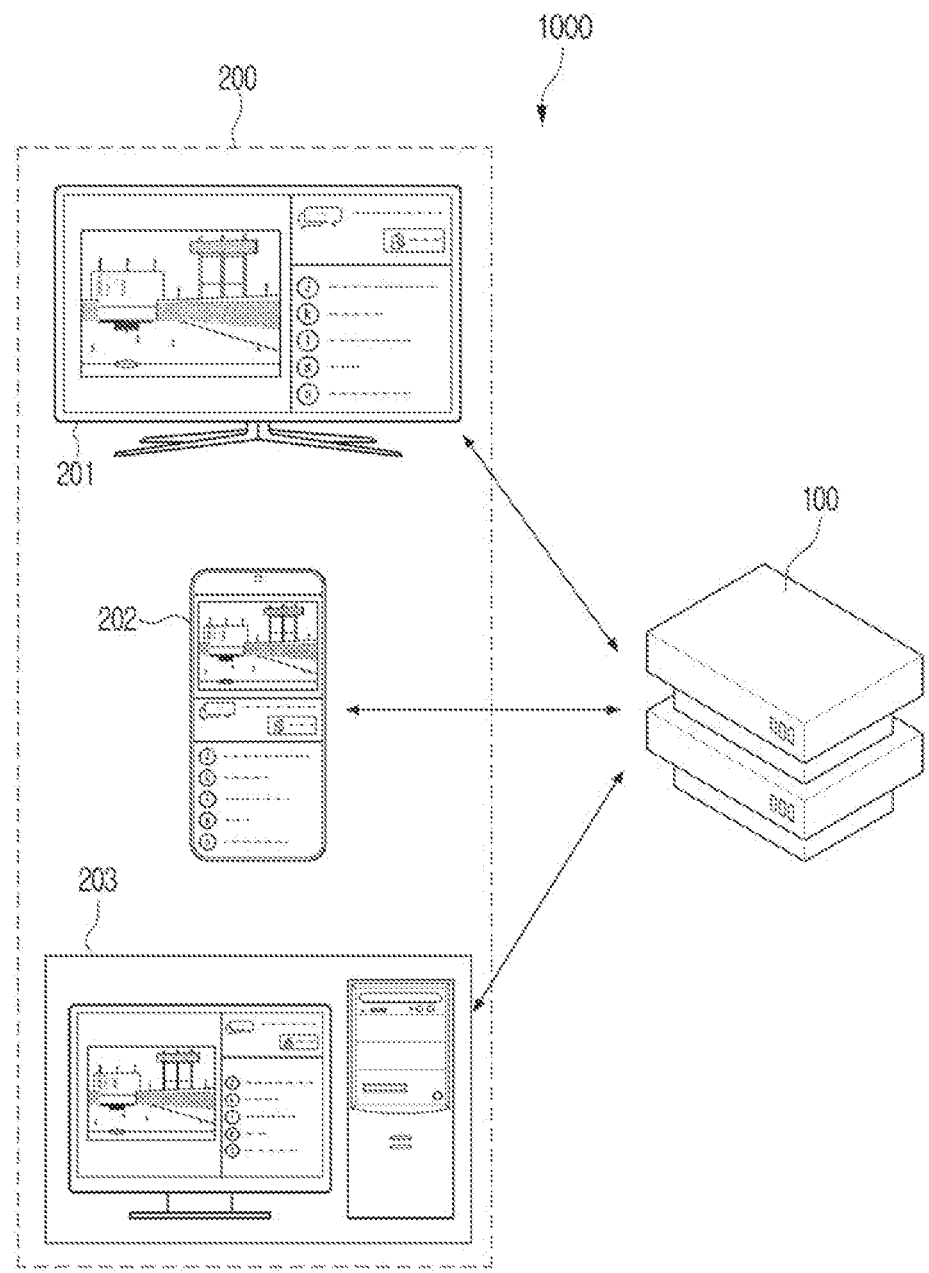
FIG. 1 is a view for explaining a system including an electronic apparatus and a terminal device.

Hereinafter, the disclosure is described in detail with reference to the accompanying drawings.

General terms that are currently widely used are selected as possible as terms used in embodiments of the disclosure in consideration of their functions in the disclosure, and may be changed based on the intention of those skilled in the art or a judicial precedent, the emergence of a new technique, or the like. In addition, in a specific case, terms arbitrarily chosen by an applicant may exist. In this case, the meanings of such terms are described in detail in corresponding descriptions of the disclosure. Therefore, the terms used in the disclosure need to be defined based on the meanings of the terms and the content throughout the disclosure rather than simple names of the terms.

In the disclosure, an expression "have," "may have," "include," "may include", or the like, indicates the existence of a corresponding feature (for example, a numerical value, a function, an operation, or a component such as a part), and does not exclude the existence of an additional feature.

Expressions, "at least one of A and B" and "at least one of A or B" should be interpreted to mean any one of "A" or "B" or "A and B." As another example, "performing at least one of steps 1 and 2" or "performing at least one of steps 1 or 2" means the following three juxtaposition situations: (1) performing step 1; (2) performing step 2; (3) performing steps 1 and 2.

Expressions "first," "second," and the like, used in the specification may indicate various components regardless of the sequence and/or importance of the components. These expressions are used only to distinguish one component from another component, and do not limit the corresponding components.

When any component (for example, a first component) is mentioned to be "(operatively or communicatively) coupled with/to" or "connected to" another component (for example, a second component), it is to be understood that any component may be directly coupled to another component or may be coupled to another component through still another component (for example, a third component).

A term of a singular number may include its plural number unless explicitly indicated otherwise in the context. It is to be understood that a term "include," "formed of," or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

Elements described as "modules" or "part" may be physically implemented by analog and/or digital circuits including one or more of a logic gate, an integrated circuit, a microprocessor, a microcontroller, a memory circuit, a passive electronic component, an active electronic component, and the like.

In the specification, such a term as a "user" may refer to a person who uses an electronic apparatus or an apparatus (for example, an artificial intelligence electronic apparatus) which uses an electronic apparatus.

Hereinafter, embodiments of the disclosure are described in detail with reference to the accompanying drawings.

FIG. 1 is a view for explaining a system 1000 including at least one of an electronic apparatus 100 or a terminal device 200.

The system 1000 may include the electronic apparatus 100. The electronic apparatus 100 may be a device that provides a chat service. The electronic apparatus 100 may be a server.

The system 1000 may include the terminal device 200. The terminal device 200 may be a device including a display. The terminal device 200 may display the chat service provided from the electronic apparatus 100. The terminal device 200 may receive and display a screen related to the chat service provided from the electronic apparatus 100.

The terminal device 200 that receives the chat service may be various devices. The terminal device 200 may include at least one of a first terminal device 201, a second terminal device 202, or a third terminal device 203. The terminal device 200 may be a variety of display devices such as a television (TV), a smartphone, a personal computer (PC), or a tablet PC. The devices included in the terminal device 200 may communicate with the electronic apparatus 100 by using different manners of communication.

For example, the first terminal device 201 may communicate with the electronic apparatus 100 by using an antenna. The second terminal device 202 may communicate with the electronic apparatus 100 by using a wireless network. The third terminal device 203 may communicate with the electronic apparatus 100 by using a wired internet network.

Figure 2:
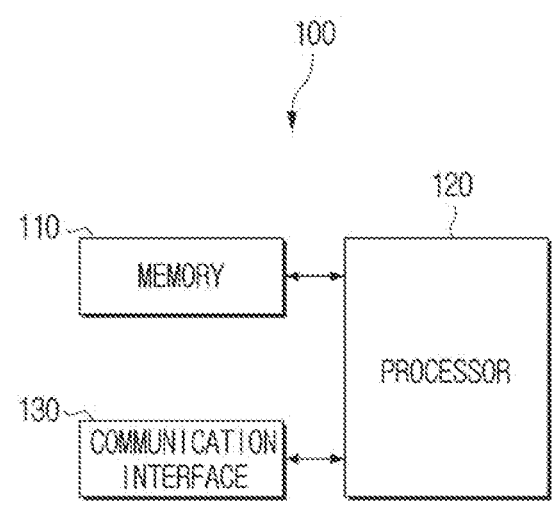
FIG. 2 is a block diagram for explaining the electronic apparatus according to one or more embodiments of the disclosure.

FIG. 2 is a block diagram for explaining the electronic apparatus 100 according to one or more embodiments of the disclosure.

Referring to FIG. 2, the electronic apparatus 100 may include at least one of at least one memory 110, at least one processor 120, or a communication interface 130.

At least one processor 120 may perform an overall control operation of the electronic apparatus 100. At least one processor 120 may function to control the overall operation of the electronic apparatus 100.

The descriptions of the memory 110, at least one processor 120, and the communication interface 130 may respectively correspond to the descriptions of the memory 210, at least one processor 220, and communication interface 230 of FIG. 2.

At least one processor 120 may acquire plurality of broadcast schedule information of different standard time zones and store the same in the at least one memory 110, identify a plurality of broadcast times in which target content is broadcast among the plurality of broadcast schedule information, and provide the chat service for the target content during a target time including the plurality of broadcast times.

At least one processor 120 may acquire the broadcast schedule information. The broadcast schedule information may include information related to a schedule of content provided based on a time. The broadcast schedule information may include content schedules based on various units.

The unit may include at least one of a monthly unit, a weekly unit, a daily unit, or one-time provision unit. The one-time provision unit may be a unit indicating a schedule provided one time, such as a disaster broadcast.

The broadcast schedule information may be schedule information related to content provided in each time zone. The plurality of broadcast schedule information may be schedule information related to content provided in the plurality of time zones.

The broadcast schedule information may be information generated by an external server 300. The external server 300 may analyze various broadcast schedules and generate the broadcast schedule information to be provided to the electronic apparatus 100.

At least one processor 120 may store the acquired broadcast schedule information in the at least one memory 110.

The broadcast schedule information may be described as content schedule information, program schedule information, channel schedule information, television guide information, or the like. The descriptions related to the broadcast schedule information are described with reference to FIGS. 6 to 10.

At least one processor 120 may acquire the plurality of broadcast schedule information. One broadcast schedule information may include schedule information related to one content provision device. The plurality of content provision devices may exist in one area, and accordingly, there is a desire to analyze schedules of various content provision devices. At least one processor 120 may acquire the plurality of broadcast schedule information to analyze content provided by various content provision devices.

At least one processor 120 may determine the target content based on the plurality of broadcast schedule information. The target content may be content for providing the chat service.

At least one processor 120 may identify, as the target content, content identified a predetermined number of times or more among the plurality of content included in the plurality of broadcast schedule information. The target content may be content included the predetermined number of times or more in the plurality of broadcast schedule information.

At least one processor 120 may identify one target content based on viewer rating information of the plurality of content that is identified the predetermined number of times or more.

A specific operation of determining the target content is described with reference to FIGS. 5, 21, and 22.

Based on the target content being determined, at least one processor 120 may determine the target time corresponding to the target content. The target time may refer to a time for providing the chat service.

For example, at least one processor 120 may continuously provide the chat service during the target time.

For example, during the target time, at least one processor 120 may provide the chat service differently from the target time. Based on the target content being provided on a schedule that is different from that of the previously determined target time, at least one processor 120 may provide the chat service differently from the target time. At least one processor 120 may determine whether to provide the chat service in consideration of the target time.

For example, at least one processor 120 may determine a time point at which the chat service starts in consideration of the target time. At least one processor 120 may end the chat service based on the target content ending regardless of the target time.

The target time may include at least one broadcast time in which the target content is provided.

At least one processor 120 may acquire first broadcast schedule information and second broadcast schedule information, identify the target content included in both the first broadcast schedule information and the second broadcast schedule information, identify a first broadcast time corresponding to the target content from the first broadcast schedule information and a second broadcast time corresponding to the target content from the second broadcast schedule information, and provide the chat service for the target content during the target time including the first broadcast time and the second broadcast time.

At least one processor 120 may acquire a first start time point and a first end time point, corresponding to the target content, based on the first broadcast time, acquire a second start time point and a second end time point, corresponding to the target content, based on the second broadcast time, and provide the chat service based on the first start time point, the first end time point, the second start time point, and the second end time point.

At least one processor 120 may determine the target time based on the earliest time point and the latest time point among the first start time point, the first end time point, the second start time point, and the second end time point. The target time may include all of the first start time point, the first end time point, the second start time point, and the second end time point.

At least one processor 120 may change each of the first start time point, the first end time point, the second start time point, and the second end time point to a reference time point (or a standard time point/system in a predetermined manner), acquire the target time including all the reference time points changed from at least one of a start point or an end time point, and provide the chat service during the target time.

The standard time point (or standard time system) may be a time expression method for representing an absolute time. For example, the standard time point may be expressed using universal time coordinated (UTC).

A specific operation of determining the target time in consideration of the plurality of broadcast times is described with reference to FIGS. 6 to 10.

The electronic apparatus 100 may further include the communication interface 130. At least one processor 120 may generate address information (or access address information) corresponding to the chat service based on the target time, and transmit the address information corresponding to the chat service to the terminal device 200 through the communication interface 130.

The address information may include information for accessing the chat service. The address information may include at least one of an internet address, a network address, or a security code.

Based on a user input being received from terminal device 200, at least one processor 120 may transmit a first screen related to the chat service to the terminal device 200 through the communication interface 130, update the first screen to a second screen based on the user input, and transmit the second screen updated from the first screen to the terminal device 200 through the communication interface 130.

A detailed description thereof is described with reference to FIGS. 11 and 12.

The communication interface 130 may include a first communication interface and a second communication interface, and at least one processor 120 may transmit the address information to the first terminal device through the first communication interface and transmit the address information to the second terminal device through the second communication interface.

The chat services may be provided to various terminal devices. The electronic apparatus 100 may provide the chat services to the various terminal devices. At least one processor 120 may provide information related to the chat service to the terminal devices with different communication connection manners.

At least one processor 120 may control the display included in the electronic apparatus to display a user interface (UI) corresponding to the screen related to the chat service output from the terminal device 200 receiving the address information.

Based on information corresponding to the user input being received from the terminal device, at least one processor 120 may control the display to display the UI as changed based on the user input.

Based on the user input (for example, chat input) being received from the terminal device 200 through the communication interface 130, at least one processor 120 may update the UI based on the user input, and control the display included in the electronic apparatus to display the updated UI.

The first communication interface may be a communication interface for processing a radio frequency (RF) signal, and the second communication interface may be a communication interface for processing an internet network signal. At least one processor 120 may provide the chat service to the different terminal devices by using different communication connection manners.

An operation of providing the chat service may include an operation of providing a screen related to a chat room. The screen related to the chat room is described with reference to FIGS. 13 to 17.

An operation of comparing a candidate time with an actual content provision time is described with reference to FIGS. 18 to 20.

Methods of providing the chat services according to various embodiments are described with reference to FIGS. 21 to 32.

Figure 3:
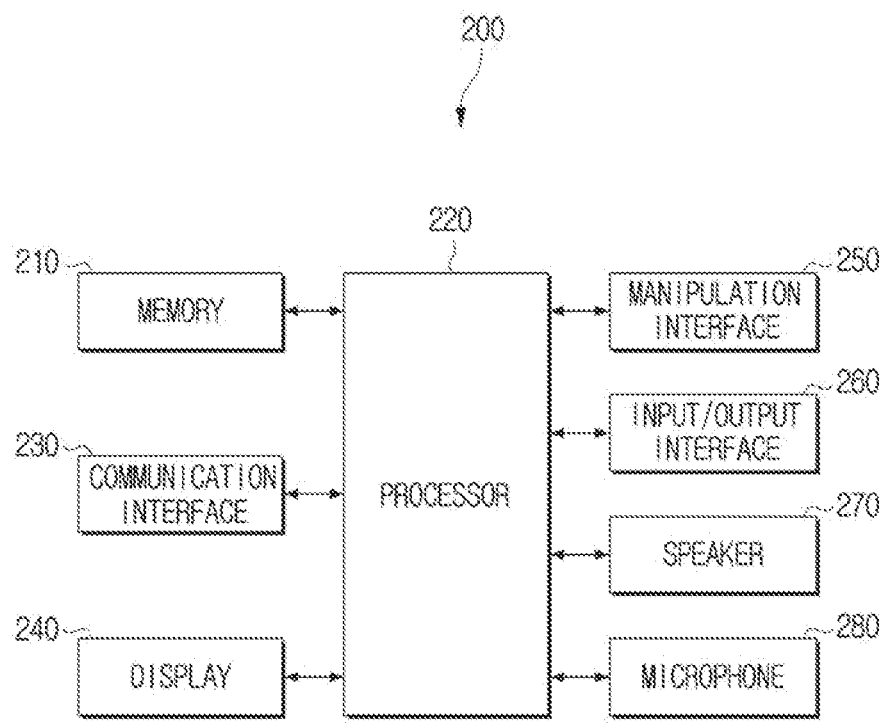
FIG. 3 is a block diagram for explaining the terminal device according to one or more embodiments of the disclosure.

According to various embodiments, the electronic apparatus 100 may include the display, and a function of the display may be the same as a function of a display 240 of the terminal device 200 of FIG. 3.

The above-described operations are described as being performed by the electronic apparatus 100 which represents the server. According to various embodiments, the above-described operations may be performed in the terminal device 200 itself.

At least one operation performed by the electronic apparatus 100 may be performed by the terminal device 200. For example, the terminal device 200 may perform all of the following operations: acquiring the broadcast schedule information, identifying the target content, acquiring the broadcast time of the target content, identifying the target time, providing the chat service, and the like. A description thereof is already provided in describing the operation of the electronic apparatus 100, and its details are thus omitted. For example, at least one of steps S1101, S1102, S1120, S1130, S1140, S1150, or S1160, shown in FIG. 11, may be performed by the terminal device 200.

Likewise, at least one operation performed by the external server 300 may be performed by the electronic apparatus 100 or the terminal device 200. For example, operations of collecting and/or analyzing the broadcast schedule information, performed by the external server 300, may be performed by the electronic apparatus 100 or the terminal device 200.

According to various embodiments, the electronic apparatus 100 may acquire the plurality of broadcast schedule information in the same standard time zone. The chat service may be provided in consideration of the plurality of broadcast schedule information acquired in the same standard time zone. Accordingly, the above-described operations may be applied based on the broadcast schedule information acquired in the same standard time zone.

FIG. 3 is a block diagram for explaining the terminal device 200 according to one or more embodiments of the disclosure.

FIG. 3 is a block diagram for explaining a specific configuration of the terminal device 200 of FIG. 2.

Referring to FIG., the terminal device 200 may include at least one of the memory 210, at least one processor 220, the communication interface 230, the display 240, a manipulation interface 250, an input/output interface 260, a speaker 270, a microphone 280, or a camera 290.

The memory 210 may be implemented as an internal memory such as a read-only memory (ROM, e.g., electrically erasable programmable read-only memory (EEPROM)) or a random access memory (RAM), included in at least one processor 220, or as a memory separate from at least one processor 220. In this case, the memory 210 may be implemented in the form of a memory embedded in the terminal device 200 or in the form of a memory detachable from the terminal device 200, based on a data storage purpose. For example, data for driving the terminal device 200 may be stored in the memory embedded in the terminal device 200, and data for an extended function of the terminal device 200 may be stored in the memory detachable from the terminal device 200.

The memory embedded in the terminal device 200 may be implemented as at least one of a volatile memory (e.g., a dynamic RAM (DRAM), a static RAM (SRAM) or a synchronous dynamic RAM (SDRAM)), a non-volatile memory (e.g., one time programmable ROM (OTPROM), a programmable ROM (PROM), an erasable and programmable ROM (EPROM), an electrically erasable and programmable ROM (EEPROM)), a mask ROM, a flash ROM, a flash memory (e.g., NAND flash or NOR flash), a hard drive, or a solid state drive (SSD)), and the memory detachable from the terminal device 200 may be implemented as a memory card (e.g., compact flash (CF), secure digital (SD)), micro secure digital (Micro-SD), mini secure digital (mini-SD), extreme digital (xD), or multi-media card (MMC)), an external memory which may be connected to a universal serial bus (USB) port (e.g., USB memory), or the like.

The memory 210 may store at least one instruction. The processor 220 may perform various operations based on the instruction stored in the memory 210.

At least one processor 220 may be implemented as a digital signal processor (DSP) that processes a digital signal, a microprocessor, or a time controller (TCON). However, the processor 220 is not limited thereto, and may include at least one of a central processing unit (CPU), a micro controller unit (MCU), a micro processing unit (MPU), a controller, an application processor (AP), a graphics-processing unit (GPU), a communication processor (CP), or an advanced reduced instruction set computer (RISC) machine (ARM) processor, or may be defined by these terms. The processor 220 may be implemented as a system-on-chip (SoC) or a large scale integration (LSI), in which a processing algorithm is embedded, or may be implemented in the form of a field programmable gate array (FPGA). At least one processor 220 may perform various functions by executing computer executable instructions stored in the (at least one) memory.

The communication interface 230 is a component communicating with various types of external devices according to various types of communication manners. The communication interface 230 may include a wireless communication module and a wired communication module. Each communication module may be implemented in the form of at least one hardware chip.

The wireless communication module may be a module that communicates with the external device in a wireless manner. For example, the wireless communication module may include at least one of a wireless-fidelity (Wi-Fi) module, a Bluetooth module, an infrared communication module, or other communication modules.

The Wi-Fi module and the Bluetooth module may respectively perform the communication in a Wi-Fi manner and a Bluetooth manner. In case of using the Wi-Fi module or the Bluetooth module, the communication interface 230 may first transmit and receive various connection information such as a service set identifier (SSID) or a session key, connect the communication by using this connection information, and then transmit and receive various information.

The infrared communication module may perform communication based on infrared data association (IrDA) technology transmitting data in a short distance in the wireless manner using an infrared ray between visible and millimeter waves.

In addition to the above-described communication manners, other communication modules may include at least one communication chip performing communication based on various wireless communication standards such as zigbee, third generation (3G), third generation partnership project (3GPP), long term evolution (LTE), LTE advanced (LTE-A), fourth generation (4G), and fifth generation (5G).

The wired communication module may be a module communicating with the external device in a wired manner. For example, the wired communication module may include at least one of a local area network (LAN) module, an Ethernet module, a pair cable, a coaxial cable, an optical fiber cable, or an ultra wide-band (UWB) module.

According to various embodiments, the communication interface 230 may use the same communication module (e.g., Wi-Fi module) to communicate with the external device such as a remote control apparatus and the external server.

According to various embodiments, the communication interface 230 may use different communication modules to communicate with the external device such as the remote control apparatus and the external server. For example, the communication interface 230 may use at least one of the Ethernet module or the Wi-Fi module to communicate with the external server, and may use the Bluetooth module to communicate with the external device such as the remote control apparatus. However, this case is only one or more embodiments, and the communication interface 230 may use at least one communication module among various communication modules in case of communicating with the plurality of external devices or external servers.

The display 240 may be implemented as various types of displays such as a liquid crystal display (LCD), an organic light emitting diode (OLED) display, a plasma display panel (PDP). The display 240 may include a driving circuit, a backlight unit, and the like, which may be implemented in a form such as an amorphous silicon thin film transistor (a-si TFT), a low temperature poly silicon (LTPS) TFT, or an organic TFT (OTFT). The display 240 may be implemented in a touch screen combined with a touch sensor, a flexible display, a three-dimensional (3D) display, or the like. The display 240 according to one or more embodiments of the disclosure may include not only a display panel outputting an image, but also a bezel housing the display panel. In particular, the bezel according to one or more embodiments of the disclosure may include a touch sensor detecting user interaction.

The manipulation interface 250 may be implemented in a device such as a button, a touch pad, a mouse, or a keyboard, or may be implemented in a touch screen capable of also performing a manipulation input function in addition to the above-described display function. The button may be any of various types of buttons such as a mechanical button, a touch pad, or a wheel, which is disposed on any region of a body appearance of the terminal device 200, such as its front surface, side surface, or rear surface.

The input/output interface 260 may be any of a high definition multimedia interface (HDMI), a mobile high-definition link (MHL), a universal serial bus (USB), a display port (DP), a thunderbolt, a video graphics array (VGA) port, a red-green-blue (RGB) port, a D-subminiature (D-SUB), or a digital visual interface (DVI). The input/output interface 260 may input/output at least one of audio or video signals. In some embodiments, the input/output interface 260 may include a port for inputting and outputting only the audio signal and a port for inputting and outputting only the video signal as its separate ports, or may be implemented as a single port for inputting and outputting both the audio signal and the video signal. The terminal device 200 may transmit at least one of the audio or video signals to the external device (e.g., external display device or external speaker) through the input/output interface 260. An output port included in the input/output interface 260 may be connected to the external device, and the terminal device 200 may transmit at least one of the audio or video signals to the external device through the output port.

The input/output interface 260 may be connected with the communication interface. The input/output interface 260 may transmit information received from the external device to the communication interface, or transmit information received through the communication interface to the external device.

The speaker 270 may be a component outputting not only various audio data but also various notification sounds, voice messages, or the like.

The microphone 280 may be a component receiving a user voice or other sounds and converting the same into the audio data. The microphone 280 may receive the user voice in case of being activated. For example, the microphone 280 may be integrated with the terminal device 200 in the upper, front, or side direction of the terminal device 200. The microphone 280 may include various components such as a microphone collecting the user voice in an analog form, an amplifier circuit amplifying the collected user voice, an analog to digital (A/D) conversion circuit sampling the amplified user voice and converting the same into a digital signal, a filter circuit removing a noise component from the converted digital signal, and the like.

The camera 290 may be a component capturing a subject and generating a captured image. Here, the captured image may include both of a moving image and a still image. The camera 290 may acquire an image for at least one external device, and may be implemented as a camera, a lens, an infrared sensor, or the like.

The camera 290 may include the lens and an image sensor. A type of the lens may include a general-purpose lens, a wide-angle lens, or a zoom lens, and may be determined based on the type, feature, usage environment, and the like of the terminal device 200. The image sensor may use a complementary metal oxide semiconductor (CMOS), a charge coupled device (CCD), or the like.

According to various embodiments, the terminal device 200 may include the display 240. The terminal device 200 may directly display the acquired image or content on the display 240.

According to various embodiments, the terminal device 200 may not include the display 240. The terminal device 200 may be connected to an external display device, and the image or content stored in the terminal device 200 may be transmitted to the external display device.

The terminal device 200 may transmit the image or the content to the external display device together with a control signal for controlling the image or the content to be displayed on the external display device. The external display device may be connected to the terminal device 200 through the communication interface 230 or the input/output interface 260. For example, the terminal device 200 may include no display like a set top box (STB).

The terminal device 200 may include only a small display capable of displaying only simple information such as text information. The terminal device 200 may transmit the image or the content to the external display device in the wired or wireless manner through the communication interface 230, and transmit the image or the content to the external display device through the input/output interface 260.

There may be various embodiments in which the terminal device 200 performs an operation corresponding to a user voice signal received through the microphone 280.

According to various embodiments, the terminal device 200 may control the display 240 based on the user voice signal received through the microphone 280. For example, in case of receiving the user voice signal for displaying a content "A", the terminal device 200 may control the display 240 to display the content "A".

According to various embodiments, the terminal device 200 may control the external display device connected to the terminal device 200 based on the user voice signal received through the microphone 280. The terminal device 200 may generate a control signal for controlling the external display device so that the external display device performs an operation corresponding to the user voice signal, and transmit the provided control signal to the external display device. The terminal device 200 may store a remote control application for controlling the external display device. In addition, the terminal device 200 may transmit the generated control signal to the external display device by using at least one communication method of the Bluetooth, the Wi-Fi, or an infrared ray. For example, in case of receiving the user voice signal for displaying the content "A", the terminal device 200 may transmit, to the external display device, a control signal for controlling the content "A" to be displayed on the external display device. The terminal device 200 may indicate various terminal devices capable of installing remote control applications, such as the smartphone and an artificial intelligence (AI) speaker.

According to various embodiments, the terminal device 200 may use a remote control device to control the external display device connected to the terminal device 200 based on the user voice signal received through the microphone 280. The terminal device 200 may transmit the control signal for controlling the external display device to the remote control device so that an operation corresponding to the user voice signal is performed by the external display device. In addition, the remote control device may transmit the control signal received from the terminal device 200 to the external display device. For example, in case of receiving the user voice signal for displaying the content "A", the terminal device 200 may transmit, to the remote control device, the control signal for controlling the content "A" to be displayed on the external display device, and the remote control device may transmit the received control signal to the external display device.

The terminal device 200 may receive the user voice signals in various manners.

According to various embodiments, the terminal device 200 may receive the user voice signal through the microphone 280 included in the terminal device 200.

According to various embodiments, the terminal device 200 may receive the user voice signal from the external device including the microphone. The external device may be the remote control device or the smartphone. The received user voice signal may be a digital voice signal, and may be an analog voice signal based on an implementation example. The terminal device 200 may receive the user voice signal through the wireless communication method such as Bluetooth or Wi-Fi.

The terminal device 200 may convert the user voice signal in various manners.

According to various embodiments, the terminal device 200 may acquire the text information corresponding to the user voice signal from the external server. The terminal device 200 may transmit the user voice signal (e.g., audio signal or digital signal) to the external server. The external server may be a voice recognition server. The voice recognition server may convert the user voice signal to the text information by using a speech to text (STT) function. In addition, the external server may transmit the text information corresponding to the converted user voice signal to the terminal device 200.

According to various embodiments, the terminal device 200 may acquire the text information corresponding to the user voice signal on its own. The terminal device 200 may apply the speech to text (STT) function directly to the digital voice signal to convert the same to the text information, and transmit the converted text information to the external server.

The external server may transmit information to the terminal device 200 in various manners.

According to various embodiments, the external server may transmit the text information corresponding to the user voice signal to the terminal device 200. The external server may be a server performing a voice recognition function of converting the user voice signal to the text information.

According to various embodiments, the external server may transmit, to the terminal device 200, at least one of the text information corresponding to the user voice signal or search result information corresponding to the text information. The external server may be a server performing a search result provision function for providing the search result information corresponding to the text information in addition to the voice recognition function of converting the user voice signals to the text information. For example, the external server may be a server performing both the voice recognition function and the search result provision function. For another example, the external server may perform only the voice recognition function, and the search result provision function may be performed by a separate server.

The external server may transmit the text information to the separate server to acquire a search result, and acquire the search result corresponding to the text information from the separate server.

The terminal device 200 may communicate with the external device and the external server in various manners.

According to various embodiments, communication modules for communication with the external device and the external server may be identically implemented. For example, the terminal device 200 may communicate with the external device by using the Bluetooth module, and communicate with the external server also by using the Bluetooth module.

According to various embodiments, communication modules for communication with the external device and the external server may be separately implemented. For example, the terminal device 200 may communicate with the external device by using the Bluetooth module, and also communicate with the external server by using an Ethernet modem or the Wi-Fi module.

Figure 4:
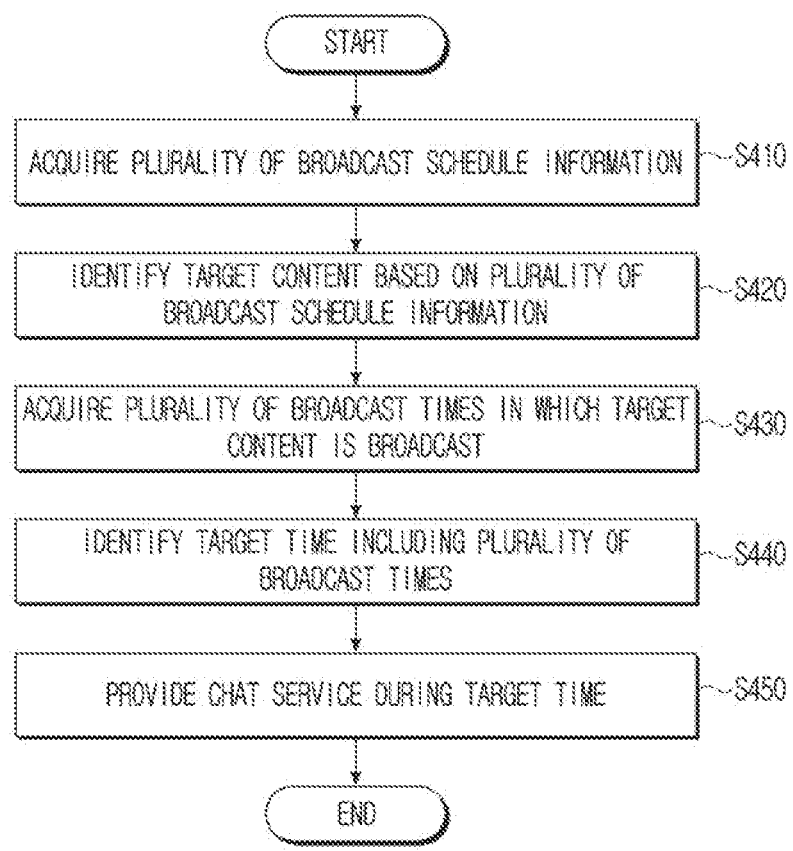
FIG. 4 is a flowchart for explaining an operation of providing a chat service based on broadcast schedule information.

FIG. 4 is a flowchart for explaining the operation of providing the chat service based on the broadcast schedule information.

Referring to FIG. 4, the electronic apparatus 100 may acquire the plurality of broadcast schedule information (S410). The electronic apparatus 100 may acquire the plurality of broadcast schedule information. Broadcast schedule information may each include content provision schedules provided through various channels.

The electronic apparatus 100 may identify the target content based on the plurality of broadcast schedule information (S420). The target content may be content that serves as a reference for providing the chat service. For example, the electronic apparatus 100 may provide the chat service for the target content.

The electronic apparatus 100 may acquire the plurality of broadcast times in which the target content is broadcast based on the plurality of broadcast schedule information (S430). In some embodiments, one broadcast time may be acquired.

The electronic apparatus 100 may identify the target time including the plurality of broadcast times (S440). The target time may be the time in which the chat service is provided. The target time may be greater than or equal to the sum of the plurality of broadcast times. For example, based on the sum of the plurality of broadcast times being 2 hours, the target time may be 2 hours or greater than 2 hours.

The electronic apparatus 100 may provide the chat service during the target time (S450). The electronic apparatus 100 may provide the chat service based on the determined target time. The electronic apparatus 100 may provide no chat service during a time other than the target time. Even when a general user accesses a chat-related function during the time other than the target time, the terminal device 200 may not be provided with the chat service corresponding to the target content.

The electronic apparatus 100 may sample specific broadcast schedule information for each time zone among the acquired plurality of broadcast schedule information. The electronic apparatus 100 may perform a sampling operation based on at least one of geographic data (e.g., population) or number of viewers. The electronic apparatus 100 may sample a popular area or popular broadcast schedule information.

The reason why the sampling operation is necessary is to reduce a calculation processing time. An operation of comparing all the broadcast schedule information with each other may require a long process time. Therefore, the plurality of broadcast schedule information may be filtered through the specific schedule sampling operation.

The electronic apparatus 100 may identify main broadcast schedule information among the plurality of broadcast schedule information. The main broadcast schedule information may include at least one. The main broadcast schedule information may be used as reference information for a comparison calculation process. The reason for identifying the main broadcast schedule information is to reduce a comparison calculation time. The main broadcast schedule information may be determined based on the geographic data (e.g., population).

The main broadcast schedule information may be determined based on the population of an area corresponding to each plurality of broadcast schedule information. The area to which each broadcast schedule information is provided may be classified by an area code (e.g., zip code). The electronic apparatus 100 may pre-store information on the population of each area. Based on the broadcast schedule information being acquired, the electronic apparatus 100 may predict the population by using the area code included in the broadcast schedule information. The electronic apparatus 100 may identify the broadcast schedule information corresponding to the largest population among the plurality of broadcast schedule information.

The electronic apparatus 100 may determine, as the target content, content broadcast in a predetermined pattern among the sampled broadcast schedule information. The electronic apparatus 100 may provide the chat service for the target content. A description of the predetermined pattern is described with reference to FIG. 6.

The broadcast schedule information may include schedules provided from various areas or various content providers. The broadcast schedule information may include identification information (e.g., identification (ID) code) corresponding to the content. Even when the broadcast time is different, the same content may be stored based on the same identification information. The electronic apparatus 100 may identify the predetermined pattern by using the content identification information from the sampled broadcast schedule information.

For example, based on a broadcast pattern of a first content being the predetermined pattern, the electronic apparatus 100 may acquire at least one broadcast time in which the first content is broadcast based on the identification information of the first content.

The above description describes that the chat service is provided by analyzing the plurality of broadcast schedule information. According to various embodiments, based on the broadcast schedule information related to a predetermined content provider being acquired, the electronic apparatus 100 may provide the chat service by using only the broadcast schedule information related to the predetermined content.

The above description describes that the chat service is provided based on the target content. According to various embodiments, the electronic apparatus 100 may provide the chat service based on a target channel (or a target content provider). For example, assume that there is a first channel specializing in sports games such as basketball, baseball, volleyball, and soccer. Assume that popularity of the first channel has a threshold value or more, and the first channel is stored as a predetermined channel. The electronic apparatus 100 may manage, as the predetermined channel, a channel for providing an independent chat service.

Based on the broadcast schedule information for the first channel being received, the electronic apparatus 100 may independently generate the chat service for the first channel.

It is assumed that a chat room related to content (e.g., World Cup opening ceremony) provided in a specific time zone of the first channel is already generated through another channel. The electronic apparatus 100 may generate a chat room of the first channel that is different from an already generated chat room. The electronic apparatus 100 may provide a guide UI for selecting one of the two chat rooms. The electronic apparatus 100 may provide a chat room corresponding to user selection.

Figure 5:
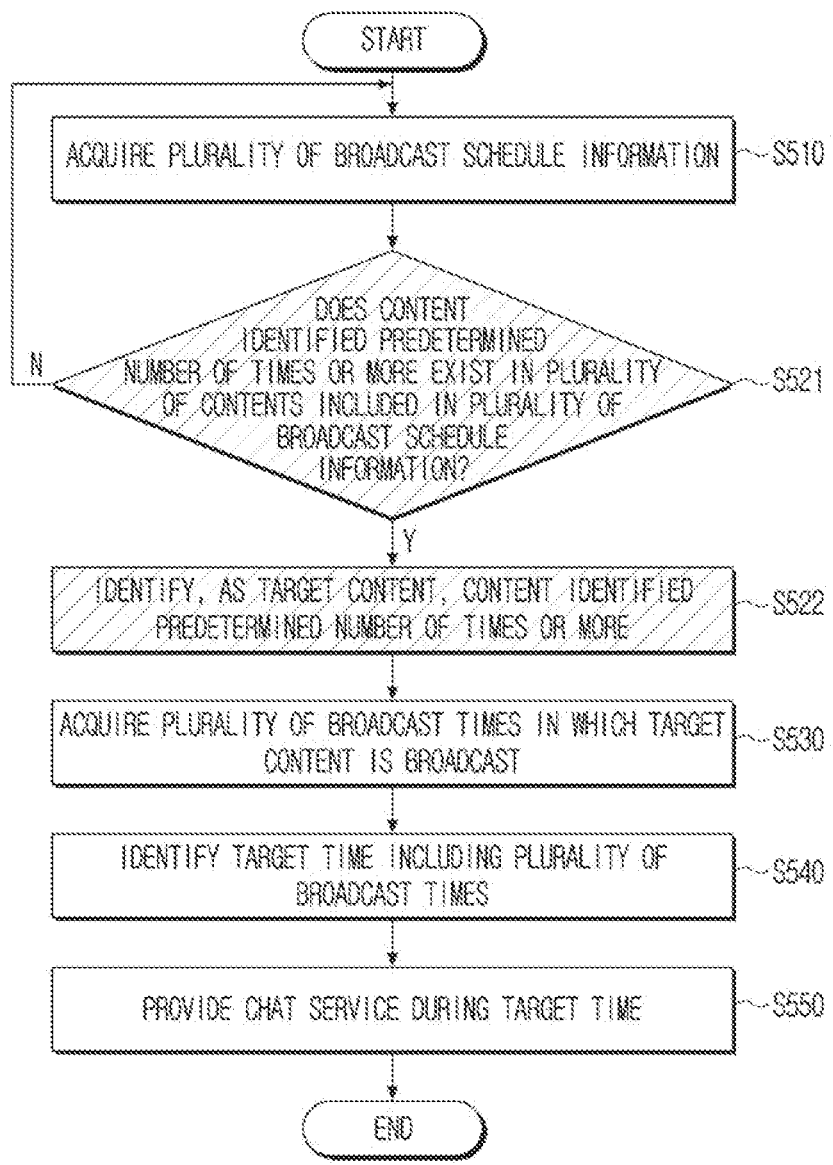
FIG. 5 is a view for explaining an operation of identifying target content.

FIG. 5 is a view for explaining an operation of identifying the target content.

The steps S510, S530, S540, and S550 of FIG. 5 may correspond to the steps S410, S430, S440, and S450 of FIG. 4. Therefore, their redundant descriptions are omitted.

After acquiring the plurality of broadcast schedule information, the electronic apparatus 100 may determine whether content identified the predetermined number of times or more exists in the plurality of content included in the plurality of broadcast schedule information (S521). The electronic apparatus 100 may count the number of times the content is provided based on the plurality of broadcast schedule information. The electronic apparatus 100 may determine whether the number of times specific content is displayed based on a counting result has the threshold value (or the predetermined number of times) or more.

Based on the counting number of the specific content being less than the predetermined number of times (S521-N), the electronic apparatus 100 may repeatedly acquire the broadcast schedule information.

Based on the counting number of the specific content being the predetermined number of times or more (S521-Y), the electronic apparatus 100 may determine, as the target content, the content (or the specific content) counted the predetermined number of times or more (S522). The electronic apparatus 100 may then perform the steps S530, S540, and S550.

Figure 6:
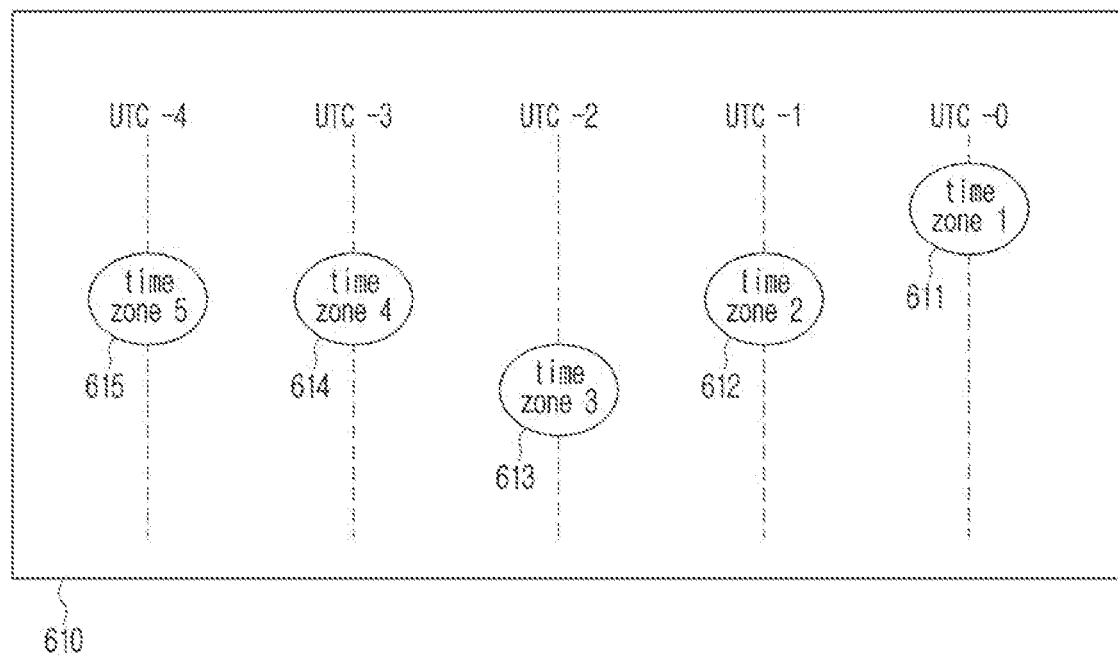
FIG. 6 is a view for explaining a broadcast schedule based on a time zone.

FIG. 6 is a view for explaining the broadcast schedule based on the time zone.

Embodiment 610 of FIG. 6 may represent a map for explaining cities belonging to different time zones. The universal time coordinated (UTC) may be used to describe the absolute time.

A first area 611 may belong to a first time zone and may be a UTC-0 time zone. The first area 611 may be an area of UTC-0.

A second area 612 may belong to a second time zone and may be a UTC-1 time zone. The second area 612 may be an area of UTC-1.

A third area 613 may belong to a third time zone and may be a UTC-2 time zone. The third area 613 may be an area of UTC-2.

A fourth area 614 may belong to a fourth time zone and may be a UTC-3 time zone. The fourth area 614 may be an area of UTC-3.

A fifth area 615 may belong to a fifth time zone and may be a UTC-4 time zone. The fifth area 615 may be an area of UTC-4 The time zone may be later as the area goes left from the first area 611 on the map. Assume that each area is 1 hour apart from each other.

The absolute time of each area at the same time point may be the same as each other. A relative time of each area at the same time point may be different from each other.

It is assumed that the absolute time of the first area 611 is UTC-0 time, and its relative time is 00:00 (hour:minute).

The absolute time of the second area 612 may be UTC-0 time, and its relative time may be 23:00.

The absolute time of the third area 613 may be UTC-0 time, and its relative time may be 22:00.

The absolute time of the fourth area 614 may be UTC-0 time, and its relative time may be 21:00.

The absolute time of the fifth area 615 may be UTC-0 time, and its relative time may be 20:00.

Table 620 of FIG. 6 shows the broadcast schedule information based on the UTC. One content provider may provide the content to different areas. A content provision time in each area may be adjusted based on a content type.

A first type of content may be broadcast at the same time in all areas. For example, the first type of content may be the World Cup opening ceremony. The first type of content may be provided in all the areas from 0:00 UTC to 1:00 UTC.

A second type of content may be broadcast at different times. For example, the second type of content may be a movie, a drama, or the like.

The second type of content may be provided in the first area 611 from 1:00 UTC to 2:00 UTC. The second type of content may be provided in the second area 612 from 2:00 UTC to 3:00 UTC. The second type of content may be provided in the third area 613 from 3:00 UTC to 4:00 UTC. The second type of content may be provided in the fourth area 614 from 4:00 UTC to 5:00 UTC. The second type of content may be provided in the fifth area 615 from 5:00 UTC to 6:00 UTC.

The operation of providing the content to each time zone or each area may be providing the content to a device (or the terminal device) that exists in each time zone or each area.

The electronic apparatus 100 may acquire at least one broadcast schedule information. The electronic apparatus 100 may identify the broadcast pattern of the content based on at least one acquired broadcast schedule information. The broadcast pattern may be the pattern (or placement information) of the broadcast time in which the specific content is broadcast.

Figure 7:
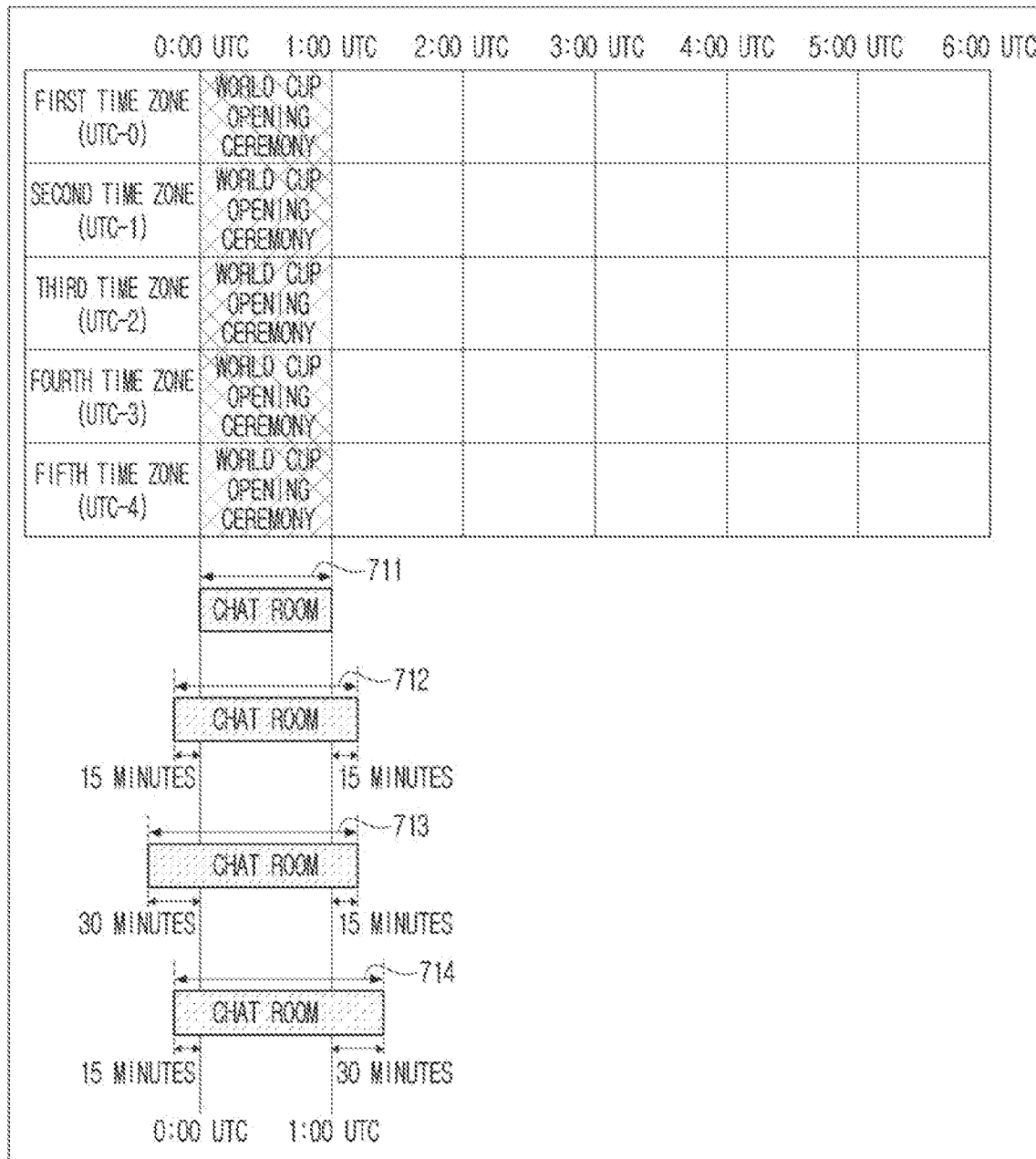
FIG. 7 is a view for explaining the chat service related to content broadcast at the same time point.

FIG. 7 is a view for explaining the chat service related to the content broadcast at the same time point.

Referring to Embodiment 710 of FIG. 7, the electronic apparatus 100 may provide the chat service for the first type of content. The first type of content may be provided in all the areas from 0:00 UTC to 1:00 UTC.

The electronic apparatus 100 may provide the chat room for the first type of content. The chat room may be an online space where people watching the first type of content may chat with each other.

The electronic apparatus 100 may determine the World Cup opening ceremony as the target content. The electronic apparatus 100 may determine the target time including a time in which the World Cup opening ceremony is provided based on the broadcast schedule information. The electronic apparatus 100 may generate the chat room based on the target time.

In some embodiments, the electronic apparatus 100 may determine a target time 711 from 0:00 UTC to 1:00 UTC. The electronic apparatus 100 may generate the chat room from 0:00 UTC to 1:00 UTC.

In some embodiments, the electronic apparatus 100 may determine a target time 712 by adding the time in which the first type of content is broadcast (i.e., 0:00 UTC to 1:00 UTC) and an auxiliary time (e.g., 15 minutes before and 15 minutes after). The auxiliary time may include a threshold time (e.g., 15 minutes) from a start time point (e.g., 0:00 UTC) of the first type of content and a threshold time (e.g., 15 minutes) from an end time point (e.g., 1:00 UTC) of the first type of content. The electronic apparatus 100 may provide the chat room from a time point of the threshold time (e.g., 15 minutes) before the start time point (e.g., 0:00 UTC) of the first type of content to a time point of the threshold time (e.g., 15 minutes) after the end time point (e.g., 1:00 UTC) of the first type of content.

In some embodiments, the electronic apparatus 100 may determine a target time 713 by adding the time in which the first type of content is broadcast (i.e., 0:00 UTC to 1:00 UTC) and an auxiliary time (e.g., 30 minutes before and 15 minutes after). The threshold time calculated at the start time point and the threshold time calculated at the end time point may be different from each other. A first threshold time calculated at the start time point may be greater than a second threshold time calculated at the end time point.

In some embodiments, the electronic apparatus 100 may determine a target time 714 by adding the time in which the first type of content is broadcast (i.e., 0:00 UTC to 1:00 UTC) and an auxiliary time (e.g., 15 minutes before and 30 minutes after). The threshold time calculated at the start time point and the threshold time calculated at the end time point may be different from each other. The first threshold time calculated at the start time point may be smaller than the second threshold time calculated at the end time point.

Values of the first threshold time and the second threshold time may be determined based on the content type. The electronic apparatus 100 may determine the target time so that the first threshold time is greater than the second threshold time for the predetermined first type of content. For example, the first type may be a sports type.

The electronic apparatus 100 may determine the target time so that the first threshold time is smaller than the second threshold time for the predetermined second type of content. For example, the second type may be a discussion type.

The electronic apparatus 100 may determine the target time in which the first threshold time and the second threshold time are equally reflected for content (or general content) that does not belong to the predetermined type.

According to various embodiments, the electronic apparatus 100 may apply a value of the auxiliary time differently based on a genre of the target content. For example, the electronic apparatus 100 may set the value of the auxiliary time to a first time (e.g., 15 minutes) for content of a first genre, and set the value of the auxiliary time to a second time (e.g., 30 minutes) for content of a second genre. The electronic apparatus 100 may adjust the first threshold time before the start time point and the second threshold time after the end time point based on the genre of the content. Based on content of a predetermined genre being identified as the target content, the electronic apparatus 100 may not provide the chat service.

Figure 8:
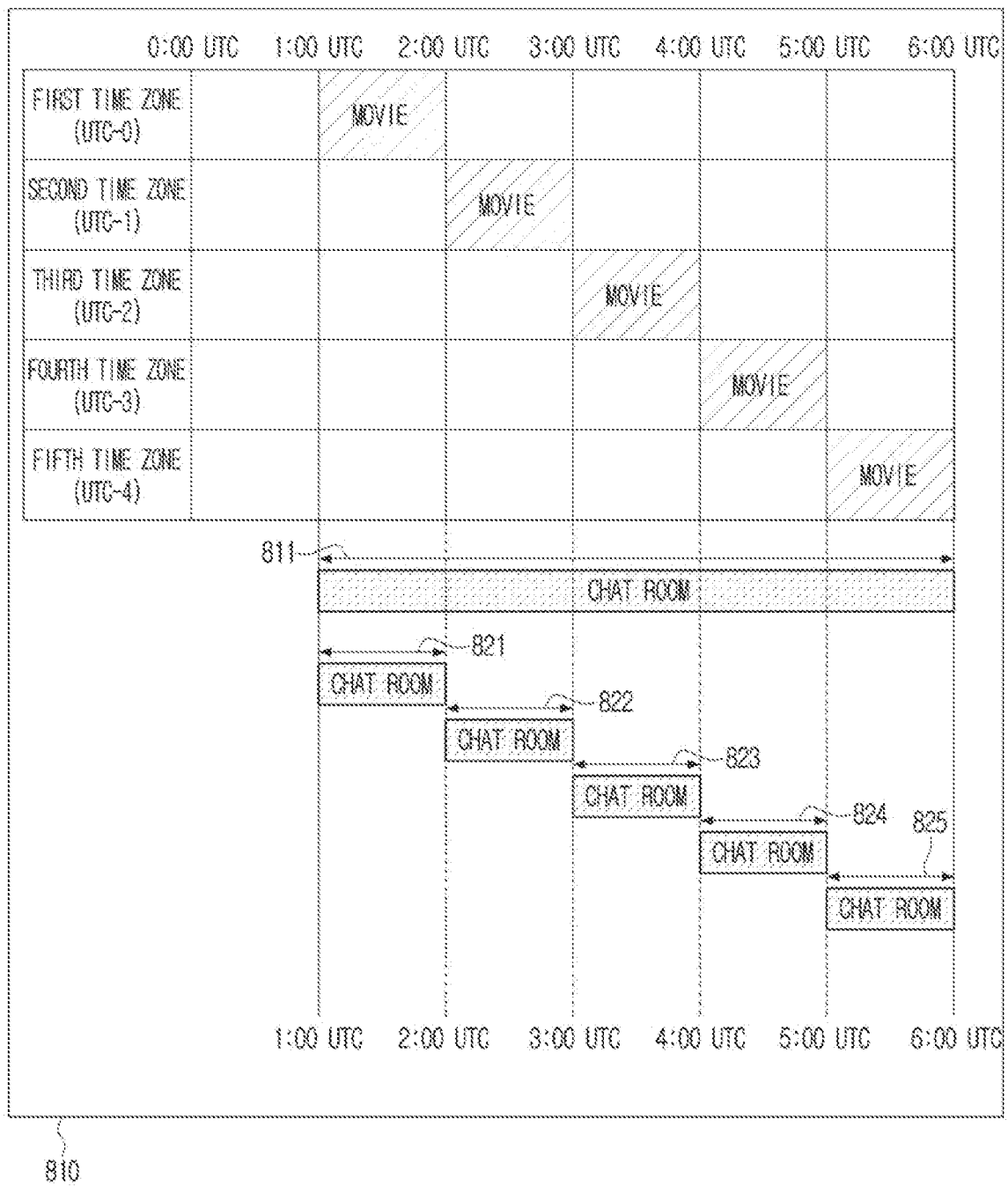
FIG. 8 is a view for explaining the chat service related to content broadcast at different time points.

FIG. 8 is a view for explaining the chat service related to content broadcast at different time points.

Referring to Embodiment 810 of FIG. 8, the electronic apparatus 100 may provide the chat service for the second type of content. The electronic apparatus 100 may provide the chat room related to the second type of content.

The second type of content (for example, a movie) may be provided in the first time zone (or UTC-0 time zone) from 1:00 UTC to 2:00 UTC. The second type of content may be provided in the second time zone (or UTC-1 time zone) from 2:00 UTC to 3:00 UTC. The second type of content may be provided in the third time zone (or UTC-2 time zone) from 3:00 UTC to 4:00 UTC. The second type of content may be provided in the fourth time zone (or UTC-3 time zone) from 4:00 UTC to 5:00 UTC. The second type of content may be provided in the fifth time zone (or UTC-4 time zone) from 5:00 UTC to 6:00 UTC.

The electronic apparatus 100 may generate the chat room in consideration of a schedule of the second type of content provided in the first time zone to the fifth time zone. The electronic apparatus 100 may acquire plurality of time information in which the second type of content is provided in the broadcast schedule information. The plurality of broadcast time information may include a first broadcast time (1:00 UTC to 2:00 UTC) provided in the first time zone, a second broadcast time (2:00 UTC to 3:00 UTC) provided in the second time zone, a third broadcast time (3:00 UTC to 4:00 UTC) provided in the third time zone, a fourth broadcast time (4:00 UTC to 5:00 UTC) provided in the fourth time zone, and a fifth broadcast time (5:00 UTC to 6:00 UTC) provided in the fifth time zone The electronic apparatus 100 may determine a target time 811 including all of the plurality of time information in which the second type of content is provided. For example, the electronic apparatus 100 may determine, as the target time, from 1:00 UTC to 6:00 UTC.

The electronic apparatus 100 may generate an entire chat room during the target time (1:00 UTC to 6:00 UTC).

According to various embodiments, the electronic apparatus 100 may generate a different chat room for each time zone.

The electronic apparatus 100 may generate a first chat room at a first target time 821 (1:00 UTC to 2:00 UTC).

The electronic apparatus 100 may generate a second chat room at a second target time 822 (2:00 UTC to 3:00 UTC).

The electronic apparatus 100 may generate a third chat room at a third target time 823 (3:00 UTC to 4:00 UTC).

The electronic apparatus 100 may generate a fourth chat room at a fourth target time 824 (4:00 UTC to 5:00 UTC).

The electronic apparatus 100 may generate a fifth chat room at a fifth target time 825 (5:00 UTC to 6:00 UTC).

The electronic apparatus 100 may provide a screen guiding selection of at least one of the entire chat room, the first chat room, the second chat room, the third chat room, the fourth chat room, or the fifth chat room. Based on the user input being received through the guide screen, the electronic apparatus 100 may provide the chat room corresponding to the user input. The user input may be input through the terminal device 200. The terminal device 200 may transmit the user input to the electronic apparatus 100.

In case of selecting all the entire chat room, a user may view chats of users belonging to various time zones.

In case of selecting an individual chat room, there may be a high probability that the user does not view chat that discloses its content in advance.

Chat content may be shared even in an area with a different time zone. Assume that the target content is provided in the first time zone (or the UTC-0 time zone) at 1:00 UTC and a chat room related to the target content is generated. A user located in the second time zone (or the UTC-1 time zone) may access the chat room in advance. The terminal device of the user located in the second time zone (or the UTC-1 time zone) may not be displaying the target content. The terminal device of the user located in the second time zone (or the UTC-1 time zone) may access the chat room related to the target content.

Figure 9:
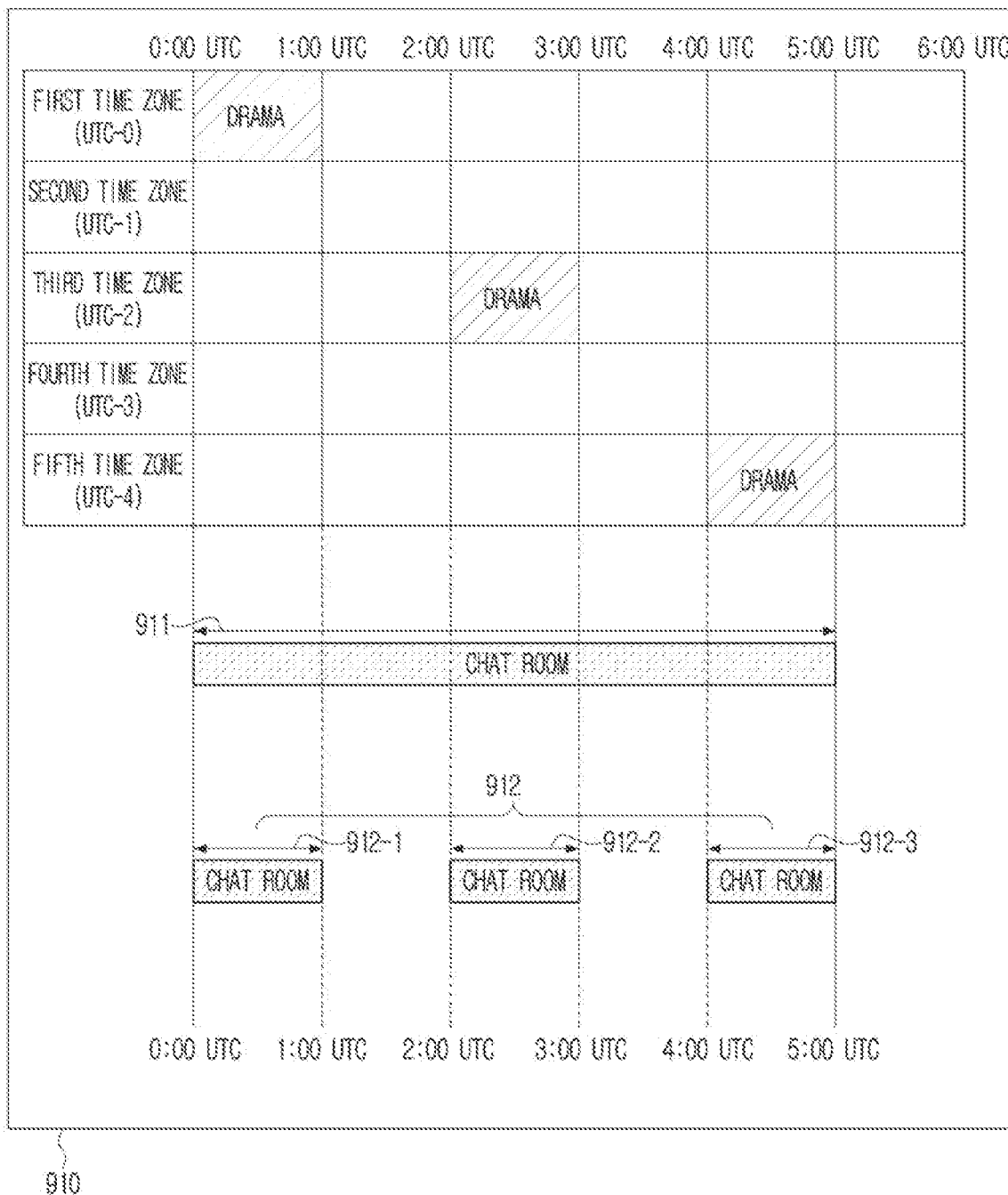
FIG. 9 is a view for explaining the chat service related to content broadcast at different time points.

FIG. 9 is a view for explaining the chat service related to content broadcast at different time points.

Referring to Embodiment 910 of FIG. 9, the electronic apparatus 100 may provide a chat service for a third type of content. The electronic apparatus 100 may provide the chat room related to the third type of content. The third type of content may include content that is identified the predetermined number of times or more rather than showing a certain pattern.

The third type of content (for example, a drama) may be provided in the first time zone (or UTC-0 time zone) from 0:00 UTC to 1:00 UTC. The third type of content (for example, the drama) may be provided in the third time zone (or UTC-2 time zone) from 2:00 UTC to 3:00 UTC. The third type of content (for example, the drama) may be provided in the fifth time zone (or UTC-4 time zone) from 4:00 UTC to 5:00 UTC.

The electronic apparatus 100 may generate the chat room in consideration of a schedule of the third type of content provided in the first time zone, third time zone, and the fifth time zone. The electronic apparatus 100 may acquire plurality of time information in which the third type of content is provided in the broadcast schedule information.

The plurality of broadcast time information may include a first broadcast time (0:00 UTC to 1:00 UTC) provided in the first time zone, a second broadcast time (2:00 UTC to 3:00 UTC) provided in the third time zone, and a third broadcast time (4:00 UTC to 5:00 UTC) provided in the fifth time zone.

In some embodiments, the electronic apparatus 100 may determine a target time 911 including all of the plurality of time information in which the third type of content is provided. The target time may include a time from the earliest time among the plurality of broadcast times to the latest time among the plurality of broadcast times. For example, the electronic apparatus 100 may determine, as the target time, from 0:00 UTC to 5:00 UTC. The electronic apparatus 100 may generate the chat rooms during the target time (1:00 UTC to 5:00 UTC).

In some embodiments, the electronic apparatus 100 may generate the chat room during the target time 911. The electronic apparatus 100 may provide a screen including the notification information during times (1:00 UTC to 2:00 UTC, 3:00 UTC to 4:00 UTC, and 5:00 UTC to 6:00 UTC) other than the broadcast times. The electronic apparatus 100 may not provide the notification information during the broadcast times (0:00 UTC to 1:00 UTC, 2:00 UTC to 3:00 UTC, and 4:00 UTC to 5:00 UTC). A detailed description of the notification information is described with reference to FIG. 31. The notification information may include at least one of an advertisement, weather, local major notification, the viewer rating information, or content summary information.

In some embodiments, the electronic apparatus 100 may generate the chat room by determining the target time 911, and may limit an access time. The electronic apparatus 100 may generate the chat room during the target time 911 and then block a user access based on the time. For example, the electronic apparatus 100 may provide the chat service to the user during access permission times (0:00 UTC to 1:00 UTC, 2:00 UTC to 3:00 UTC, and 4:00 UTC to 5:00 UTC). The electronic apparatus 100 may not provide the chat service to the user at a time other than the access permission time even when the chat room is generated.

In some embodiments, the electronic apparatus 100 may include a target time 912 including only the plurality of time information in which the third type of content is provided. For example, the target time 912 may include the first broadcast time (0:00 UTC to 1:00 UTC), the second broadcast time (2:00 UTC to 3:00 UTC), and the third broadcast time (4:00 UTC to 5:00 UTC). The electronic apparatus 100 may generate the chat room during the target time (0:00 UTC to 1:00 UTC, 2:00 UTC to 3:00 UTC, and 4:00 UTC to 5:00 UTC). The electronic apparatus 100 may not provide the chat room during the time other than the target time.

FIG. 10 is a view for explaining an operation of providing the chat service in consideration of the start time and end time of content.

Referring to Embodiment 1010 of FIG. 10, even when the second type of content is provided in different time zones, the broadcast time of the same content may be different based on a content provision server or a content provision manner.

A first server #01 in the first time zone (or UTC-0 time zone) may provide the second type of content starting from a time point before 1:00 UTC.

A second server #02 in the first time zone (or UTC-0 time zone) may provide the second type of content starting from a time point of 1:00 UTC.

A third server #03 in the first time zone (or UTC-0 time zone) may provide the second type of content starting from a time point after 1:00 UTC.

In addition, the content may be provided in a similar manner in the second time zone (or UTC-1 time zone), the third time zone (or UTC-2 time zone), the fourth time zone (or UTC-3 time zone), and the fifth time zone (or UTC-4 time zone).

The electronic apparatus 100 may acquire the start time point and end time point of each broadcast time. The electronic apparatus 100 may acquire the earliest time point t0 and the latest time point t1 among the start time point(s) and end time point(s) of each of the plurality of broadcast times. The electronic apparatus 100 may determine, as the target time, from the earliest time point t0 to the latest time point t1. The electronic apparatus 100 may generate the chat room during the target time t0 to t1.

Figure 11:
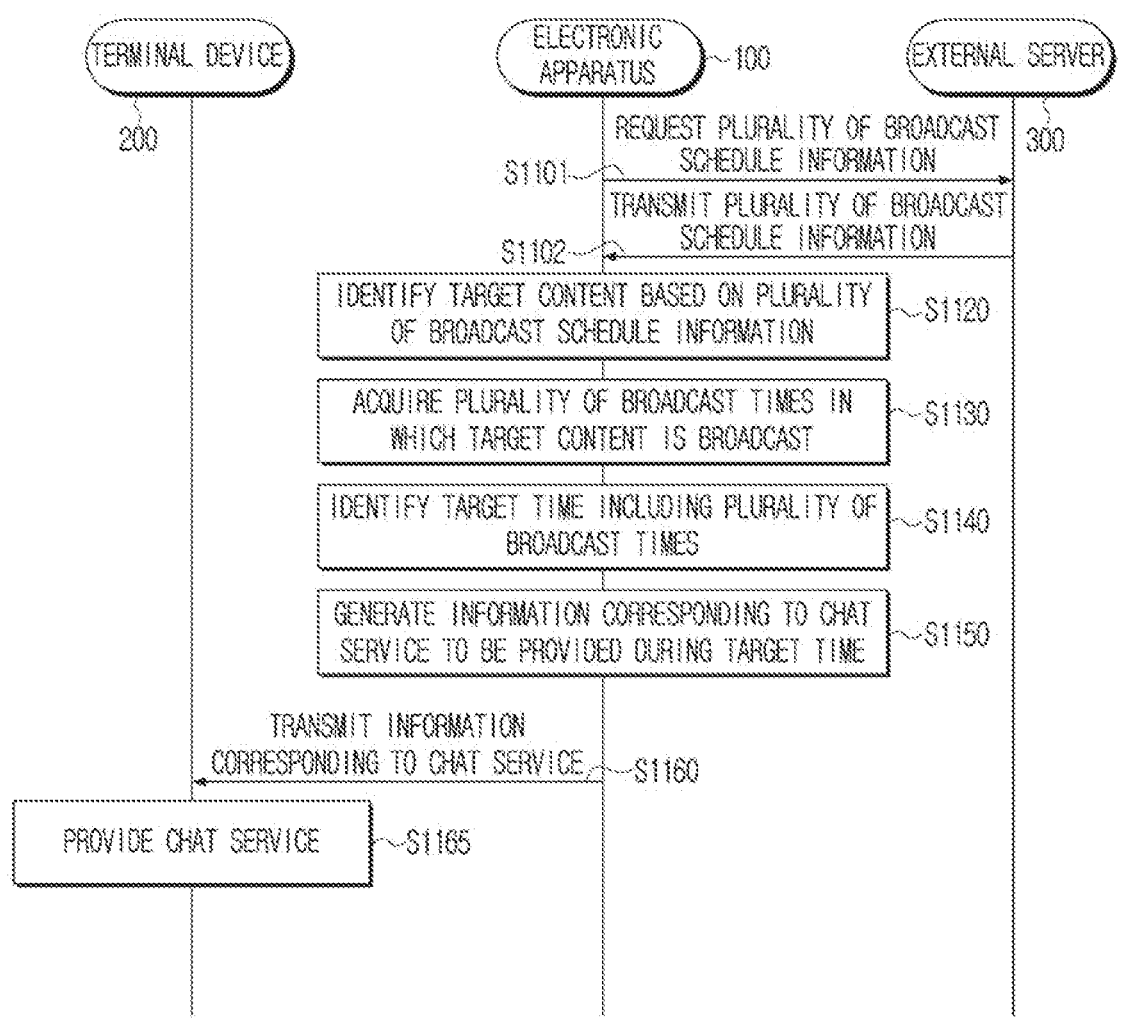
FIG. 11 is a flowchart for explaining the operation of providing the chat service to the terminal device by using the electronic apparatus and an external server.

FIG. 11 is a flowchart for explaining the operation of providing the chat service to the terminal device by using the electronic apparatus 100 and the external server 300.

The electronic apparatus 100 may request the plurality of broadcast schedule information from the external server 300 (S1101). The external server 300 may be a server that collects and provides the broadcast schedule information. The external server 300 may be a server that analyzes the broadcast schedule information and generates comprehensive result information. The external server 300 may provide information on the plurality of content providers or a plurality of broadcasting business operators.

The external server 300 may receive the request for the broadcast schedule information from the electronic apparatus 100. The external server 300 may transmit the plurality of broadcast schedule information to the electronic apparatus 100 in response to the request (S1102).

The electronic apparatus 100 may receive the plurality of broadcast schedule information from the external server 300. The electronic apparatus 100 may acquire a plurality of broadcast schedule information.

The electronic apparatus 100 may identify the target content based on the plurality of broadcast schedule information (S1120). The electronic apparatus 100 may acquire the plurality of broadcast times in which the target content is broadcast (S1130). The electronic apparatus 100 may identify the target time including the plurality of broadcast times (S1140). The electronic apparatus 100 may generate information corresponding to the chat service to be provided during the target time (S1150).

The information corresponding to the chat service may include various information related to the chat service. The information corresponding to the chat service may include the guide screen for accessing the chat service, the address information for receiving the chat service, detailed information (e.g., title, topic, number of people, service time) related to the chat service, a service screen of the chat service itself, a user input screen related to the chat service, or the like.

The electronic apparatus 100 may transmit the information corresponding to the chat service to the terminal device 200 (S1160).

The terminal device 200 may receive the information corresponding to the chat service from the electronic apparatus 100. The terminal device 200 may provide the chat service based on the received information corresponding to the chat service (S1165). The terminal device 200 may display the information corresponding to the chat service on the display 240 of the terminal device 200.

Figure 12:
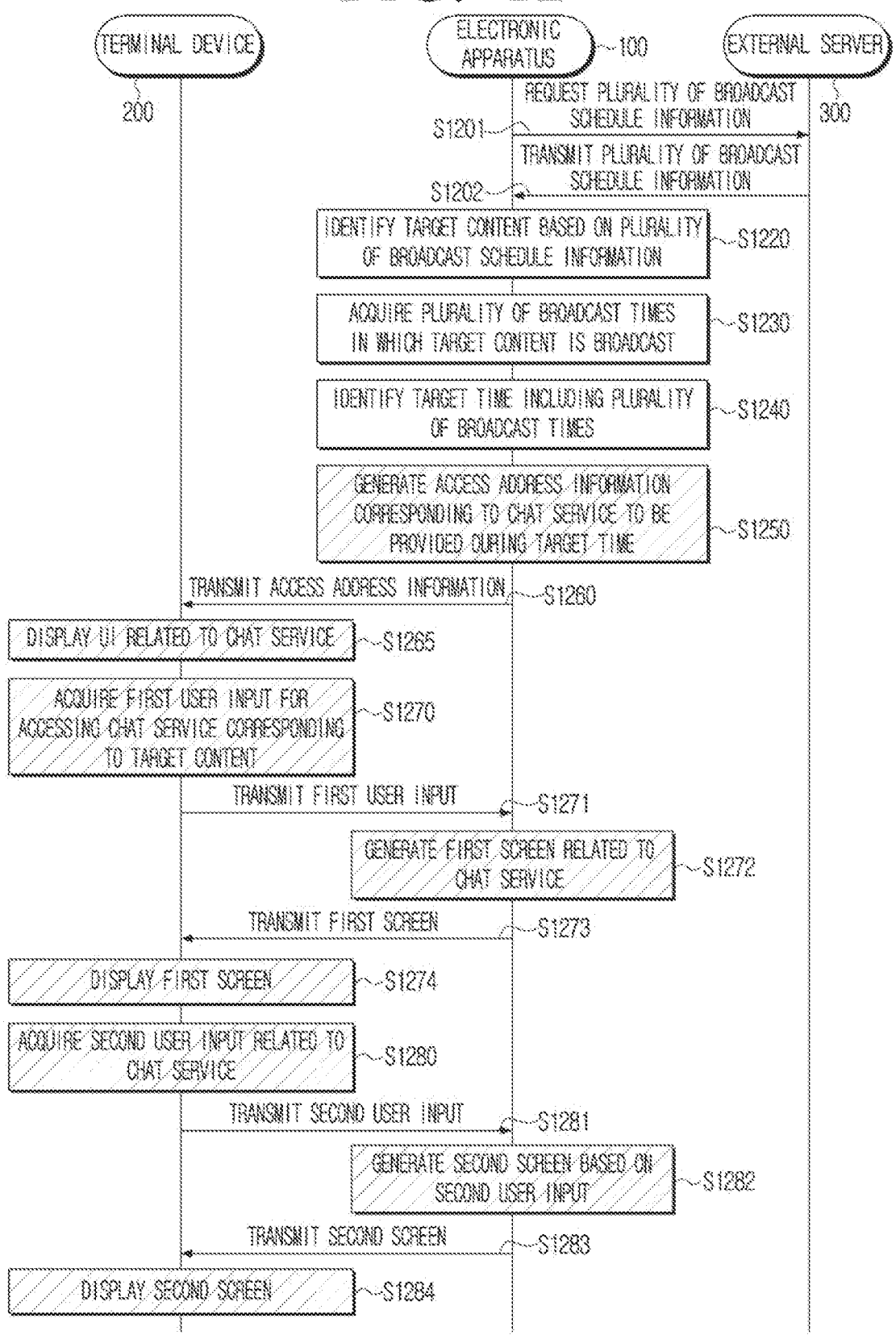
FIG. 12 is a flowchart for explaining the operation of providing the chat service in consideration of user input acquired from the terminal device.

FIG. 12 is a flowchart for explaining the operation of providing the chat service in consideration of the user input acquired from the terminal device.

The steps S1201, S1202, S1220, S1230, and S1240 of FIG. 12 may correspond to the steps S1101, S1102, S1120, S1130, and S1140 of FIG. 11. Therefore, their redundant descriptions are omitted.

After identifying the target time, the electronic apparatus 100 may generate the address information corresponding to the chat service to be provided during the target time (S1250). The electronic apparatus 100 may generate the chat room based on the target time. The electronic apparatus 100 may generate the address information for accessing the chat room. The electronic apparatus 100 may transmit the address information to the terminal device 200 (S1260).

The terminal device 200 may receive the address information from the electronic apparatus 100 (S1260). Based on the address information being received, the terminal device 200 may display the user interface (UI) related to the chat service (S1265). The UI may be a UI guiding whether the chat service is provided. A detailed description thereof is described with reference to FIG. 13.

The terminal device 200 may acquire a first user input for accessing the chat service corresponding to the target content through the UI (S1270). The terminal device 200 may transmit the first user input to the electronic apparatus 100 (S1271). The first user input may include an input to start the chat service.

The electronic apparatus 100 may receive the first user input from the terminal device 200. The electronic apparatus 100 may generate the first screen related to the chat service (S1272). The electronic apparatus 100 may transmit the first screen to the terminal device 200 (S1273).

The terminal device 200 may receive the first screen from the electronic apparatus 100. The terminal device 200 may display the first screen (S1274).

In a state where the first screen is displayed, the terminal device 200 may acquire a second user input related to the chat service (S1280). The terminal device 200 may transmit the second user input related to the chat service to the electronic apparatus 100 (S1281). The second user input may include a message input.

The electronic apparatus 100 may receive the second user input from the terminal device 200. The electronic apparatus 100 may generate the second screen based on the second user input (S1282). The electronic apparatus 100 may transmit the second screen to the terminal device 200 (S1283).

The terminal device 200 may receive the second screen from the electronic apparatus 100. The terminal device 200 may display the second screen (S1284).

Figure 13:
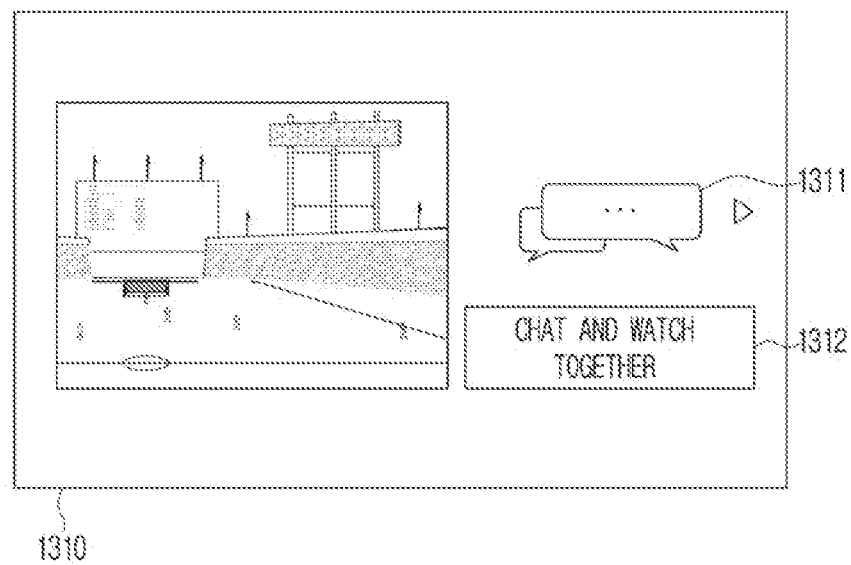
FIG. 13 is a view for explaining a screen for selecting the chat service.

FIG. 13 is a view for explaining the screen for selecting the chat service.

Referring to FIG. 13, a screen 1310 related to the chat service may include at least one of an image 1311 or a text 1312 for indicating the chat service. The image 1311 may be described as an icon, a UI, or the like. The text 1312 may include at least one of a text indicating a start of the chat service or a text indicating that the user input is used to start the chat service.

Figure 14:
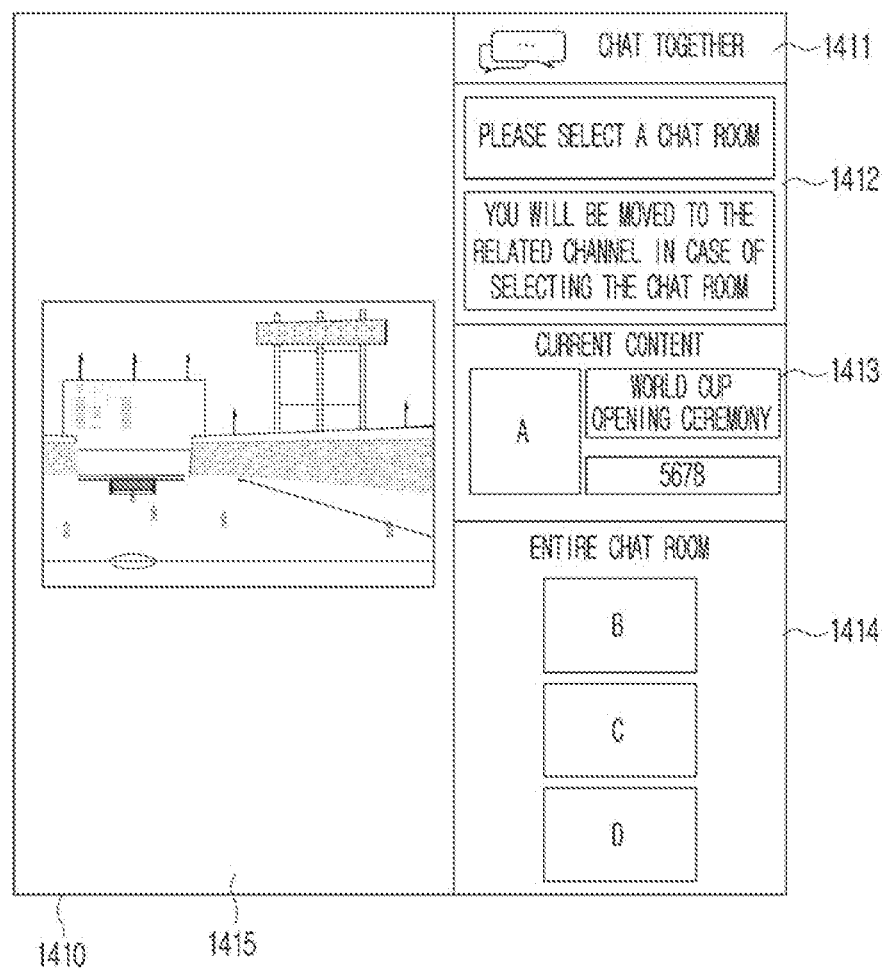
FIG. 14 is a view for explaining a screen guiding selection of the chat service.

FIG. 14 is a view for explaining the screen guiding selection of the chat service.

Referring to FIG. 14, a screen 1410 related to the chat service may include at least one of a first region 1411, a second region 1412, a third region 1413, a fourth region 1414, or a fifth region 1415.

The first region 1411 may include the image, icon, text, or the like indicating the chat service.

The second region 1412 may include guide information for selecting the chat room. The guide information may include at least one of a text requesting to select the chat room or a text indicating an action performed in case of selecting the chat room.

The third region 1413 may include information related to the chat service currently selected by (or currently provided to) the user. The information related to the chat service may include at least one of a target content name, a target content time, an image indicating the chat room, or the number of users connected to the chat room.

The fourth region 1414 may include information on at least one chat room which may currently be provided. The fourth region 1414 may include a chat room list.

A screen for a selected chat room may be provided based on one chat room being selected through the third region 1413 or the fourth region 1414.

The fifth region 1415 may be a region where content is displayed.

In some embodiments, the fifth region 1415 may be a region for displaying content currently being provided.

In some embodiments, the fifth region 1415 may be a region for displaying content (or a thumbnail image) corresponding to a chat room activated (or selected) by the user.

Figure 15:
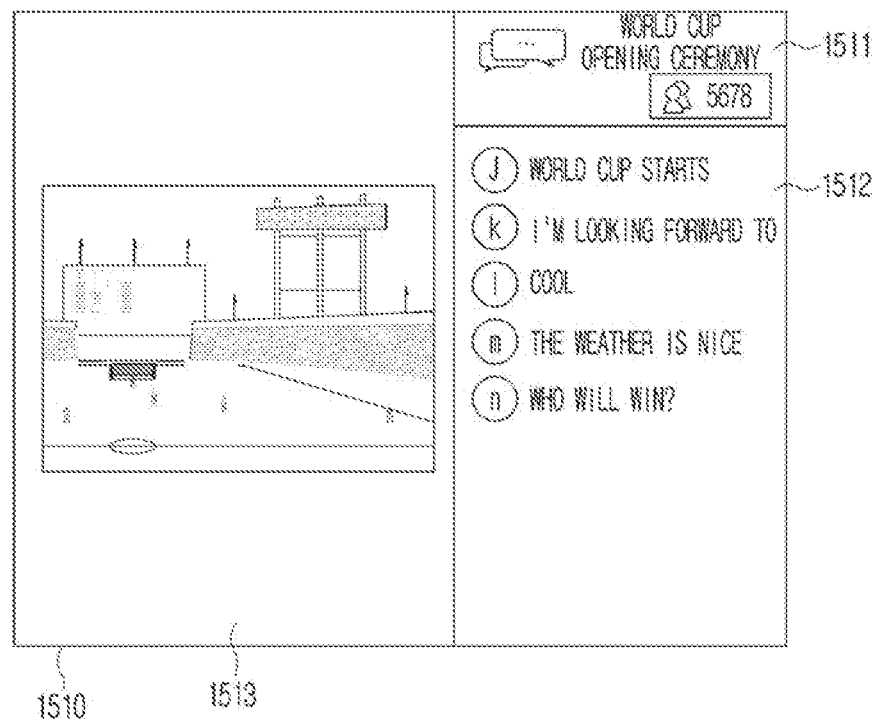
FIG. 15 is a view for explaining a screen showing the chat service.

FIG. 15 is a view for explaining a screen showing the chat service.

Referring to FIG. 15, a screen 1510 related to the chat service may include at least one of a first region 1511, a second region 1512, or a third region 1513.

The first region 1511 may include at least one of the name of the selected chat room or the number of connected users.

The second region 1512 may include user conversation input into the selected chat room.

The third region 1513 may include content corresponding to the selected chat room.

The electronic apparatus 100 may change a layout of the chat room provided as the chat service based on a type of the terminal device.

Based on the terminal device 200 being a first type, the electronic apparatus 100 may provide the chat room with a first layout corresponding to the first type. Based on the terminal device 200 being a second type, the electronic apparatus 100 may provide the chat room with a second layout corresponding to the second type.

Figure 16:
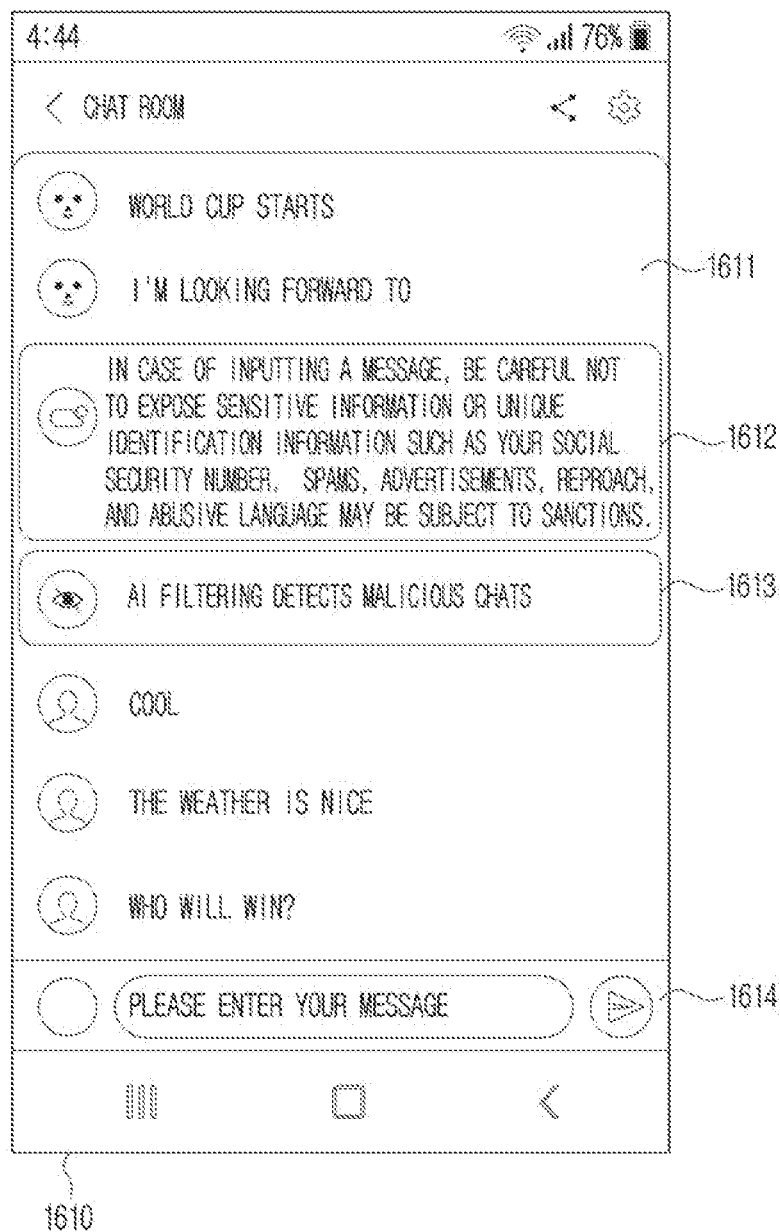
FIG. 16 is a view for explaining a filtering function of the chat service.

FIG. 16 is a view for explaining a filtering function of the chat service.

Referring to FIG. 16, a screen 1610 related to the chat service may include at least one of a first region 1611, a second region 1612, a third region 1613, or a fourth region 1614.

The first region 1611 may be a region including the user conversation.

The second region 1612 may include information indicating a precaution in case of inputting the conversation.

The third region 1613 may include information indicating a conversation filtering function. The screen 1610 may include information indicating that conversation including abusive language, advertisements, or spoilers may be blocked during the conversation or a blocking result.

The fourth region 1614 may include a screen related to the user input. The fourth region 1614 may be changed in real time only on the terminal device 200 where the screen is displayed, and may not be a region displayed to all the users connected to the chat room.

Figure 17:
FIG. 17 is a view for explaining a screen for selecting the chat service.

FIG. 17 is a view for explaining a screen for selecting the chat service.

Referring to FIG. 17, a screen 1710 related to the chat service may include at least one of a first region 1711, or a second region 1712.

The first region 1711 may include guide information for accessing the chat room.

The second region 1712 may include the chat room list accessible from the terminal device 200 on which the screen 1710 is displayed.

Figure 18:
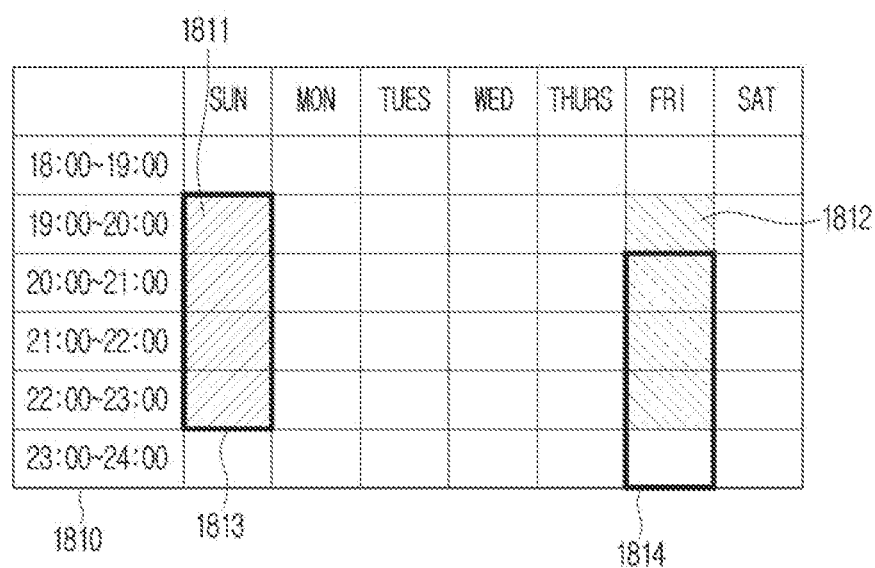
FIG. 18 is a view for explaining an operation of comparing a candidate time with an actual content provision time in the broadcast schedule information.

FIG. 18 is a view for explaining an operation of comparing a candidate time with an actual content provision time in the broadcast schedule information.

Referring to a table 1810 of FIG. 18, the electronic apparatus 100 may set the candidate time for providing the chat service. The electronic apparatus 100 may acquire the candidate time suitable for providing the chat service. The candidate time may be determined based on a chat service history or a user setting.

The chat service history may include information indicating how long chat room generation is previously provided, at what time the chat room is previously provided, or the like.

The electronic apparatus 100 may receive the chat service history and determine the target time in which the chat room is provided. Based on a predetermined event occurring, the electronic apparatus 100 may not provide the chat room. The predetermined event may include at least one of an event whose target content is the content of the predetermined genre or an event whose target time is the threshold time or less.

In some embodiments, the electronic apparatus 100 may determine the candidate time based on content popularity. The electronic apparatus 100 may identify popular content and determine the time in which the popular content is broadcast as the candidate time. The popular content may be content whose viewer rating is a first threshold value or more and whose number of viewers is greater than a second threshold value. The popularity may be determined based on the geographic data. The geographic data may include the population of an area corresponding to the standard time zone. The electronic apparatus 100 may predict the viewer rating in consideration of the geographic data and the number of viewers.

In some embodiments, the electronic apparatus 100 may determine the candidate time by using the number of chats input in the previous chat service history. The electronic apparatus 100 may determine a corresponding unit time as the candidate time based on the number of chats input in the chat service being a third threshold value or more.

The candidate time determined by the electronic apparatus 100 may be a first time 1811 (e.g., Sunday 19:00 to 23:00) or a second time 1812 (e.g., Friday 19:00 to 23:00).

The electronic apparatus 100 may acquire the broadcast time of the target content based on the determined broadcast schedule information. The broadcast time of the target content may be a third time 1813 (e.g., Sunday 19:00 to 23:00) and a fourth time 1814 (Friday 20:00 to 24:00).

The electronic apparatus 100 may compare the candidate time with the broadcast time. The electronic apparatus 100 may determine whether a time exists in which the candidate time and the broadcast time overlap with each other. Based on the candidate time and the broadcast time at least partially overlapping with each other, the electronic apparatus 100 may check whether the candidate time and the broadcast time match each other. Based on the candidate time and the broadcast time not overlapping with each other, the electronic apparatus 100 may not perform a comparison operation.

Based on the candidate time and the broadcast time matching each other, the electronic apparatus 100 may determine a matching time as the target time. The electronic apparatus 100 may generate the chat room based on the target time.

Based on the candidate time and the broadcast time not matching each other, the electronic apparatus 100 may change the candidate time based on the broadcast time. The electronic apparatus 100 may determine the target time based on the changed candidate time. The electronic apparatus 100 may generate the chat room based on the target time.

Figure 19:
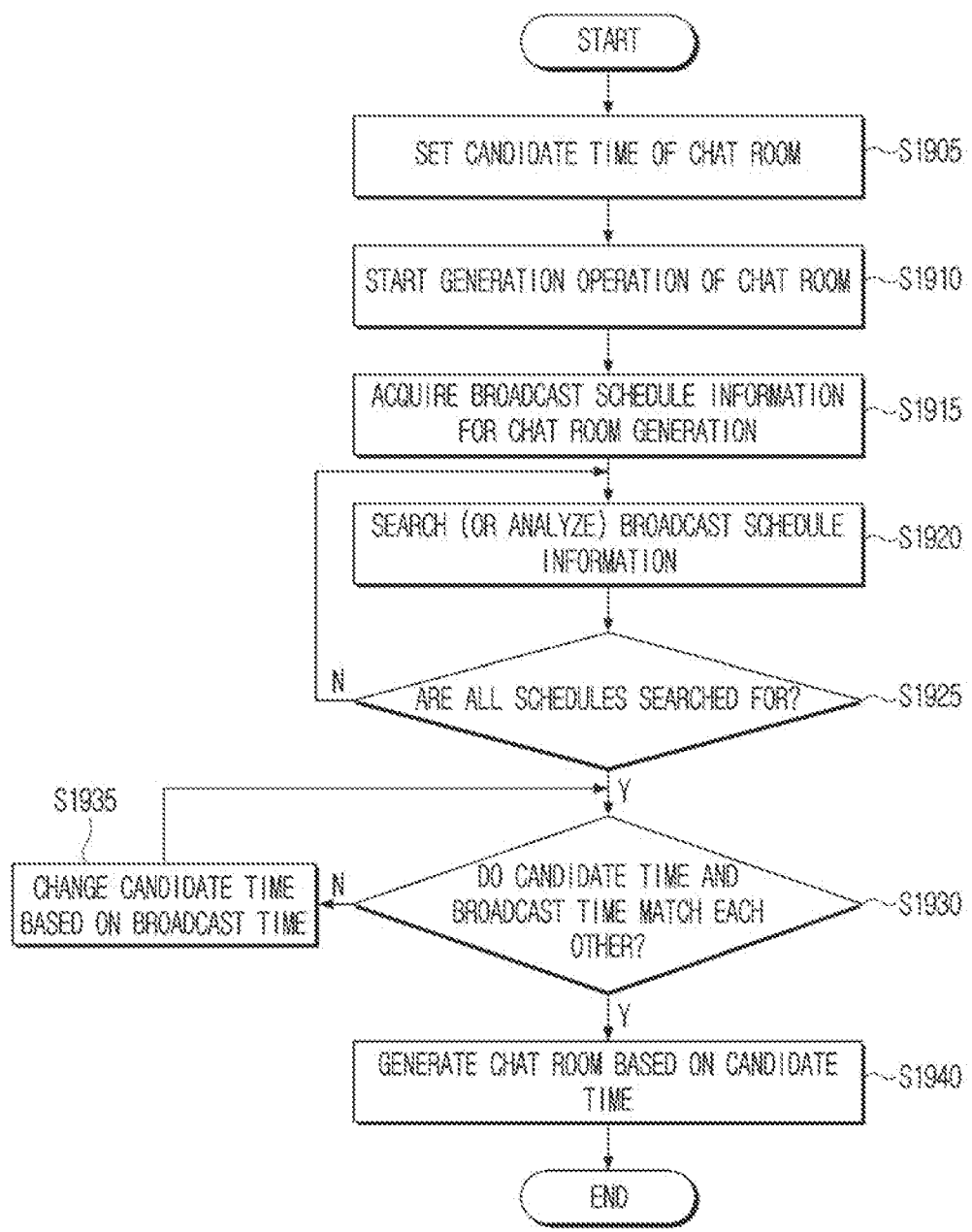
FIG. 19 is a flowchart for explaining an operation of comparing the candidate time with the actual content provision time in the broadcast schedule information.

FIG. 19 is a flowchart for explaining the operation of comparing the candidate time with the actual content provision time in the broadcast schedule information.

Referring to FIG. 19, the electronic apparatus 100 may set the candidate time of the chat room (S1905). The electronic apparatus 100 may start the generation operation of the chat room (S1910). The electronic apparatus 100 may acquire the broadcast schedule information for the chat room generation (S1915).

The electronic apparatus 100 may search (or analyze) the broadcast schedule information (S1920). The electronic apparatus 100 may determine whether all schedules are searched for (S1925). Based on all the schedules not being searched for (S1925-N), the electronic apparatus 100 may repeat steps S1920 and S1925.

Based on all the schedules being searched for (S1925-Y), the electronic apparatus 100 may check whether the candidate time and the broadcast time match each other (S1930). Based on the candidate time and the broadcast time not matching each other, the electronic apparatus 100 may change the candidate time based on the broadcast time (S1935). The electronic apparatus 100 may recheck whether the changed candidate time and the broadcast time match each other.

Based on the candidate time and the broadcast time matching each other (S1930-Y), the electronic apparatus 100 may generate the chat room based on the candidate time (S1940). The electronic apparatus 100 may determine the target time including the candidate time, and generate the chat room based on the determined target time.

Figure 20:
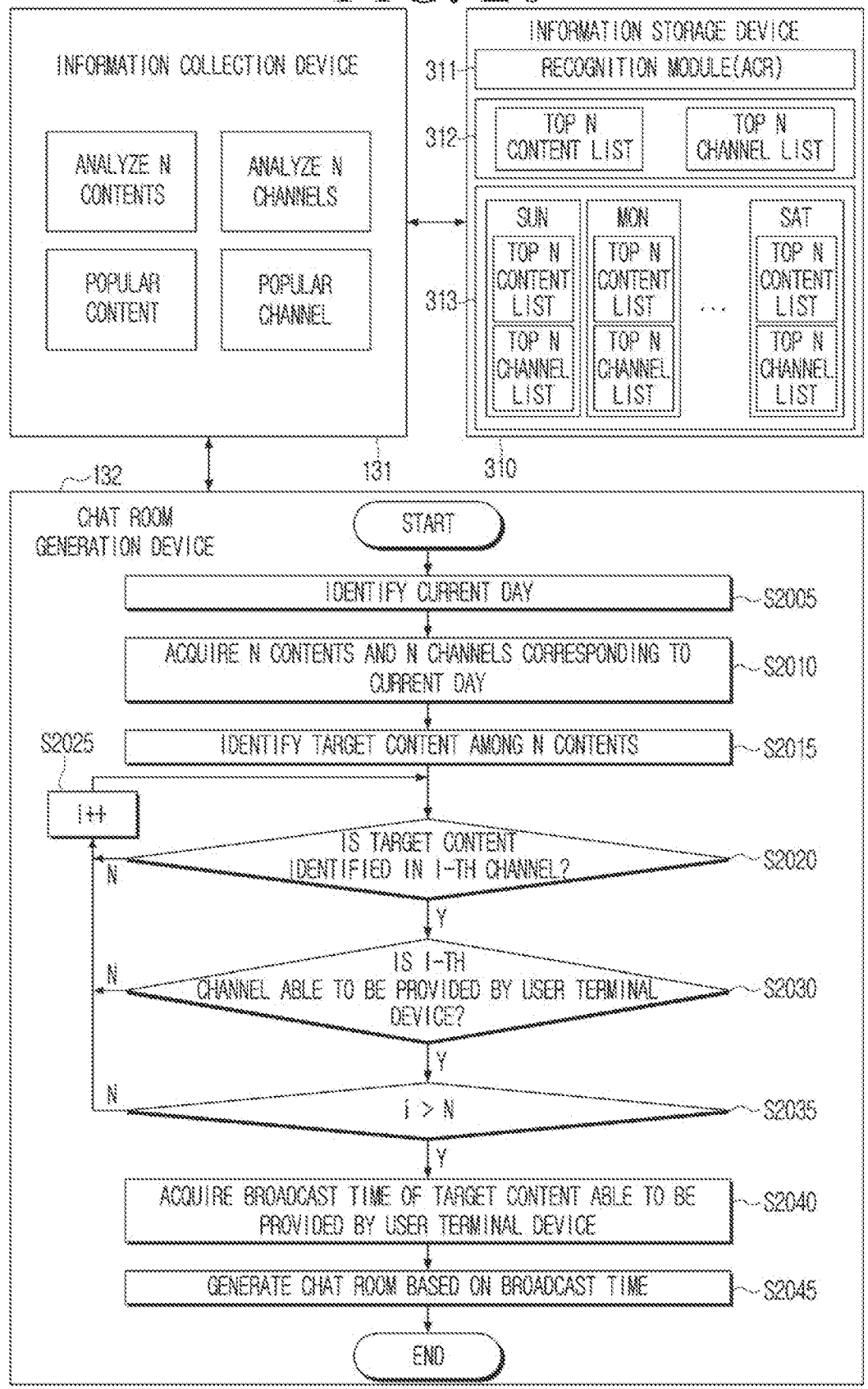
FIG. 20 is a view for explaining the operation of providing the chat service by using a program list and a channel list.

FIG. 20 is a view for explaining the operation of providing the chat service by using a program list and a channel list.

Referring to FIG. 20, the electronic apparatus 100 may include an information collection device 131. The information collection device 131 may include at least one of N content analysis results, N channel analysis results, the popular content, or a popular channel.

The external server 300 may include an information storage device 310. The information storage device 310 may include at least one of a recognition module 311, a popular list extraction module 312, or a popular list storage module 313.

The recognition module 311 may be a module recognizing content provided by the plurality of content providers or provided through the plurality of channels. The recognition module 311 may recognize the content screen by using optical character recognition (OCR), automatic content recognition (ACR), or the like. The recognition module 311 may generate a popular list based on a recognition result.

The popular list extraction module 312 may extract at least one of the popular content or the popular channel based on the recognition results of the various content screens acquired by the recognition module 311. The popular list extraction module 312 may acquire a list including the N popular content based on the recognition result. The popular list extraction module 312 may acquire a list including N popular channels based on the recognition result. "N" may be a predetermined number, and may be changed based on the user setting.

The content list may include information related to N content. The information related to content may include at least one of identification information (name, number, or frequency) of the content, identification information (name, number, frequency, or the like) of the channel providing the content, viewer rating information of the content, or viewer rating information of the channel. The viewer rating information may include at least one of the absolute number of viewers or a relative viewing rate.

The popular list storage module 313 may be a module storing the list extracted by the popular list extraction module 312. The popular list storage module 313 may store the separate lists for each day of the week.

The external server 300 may transmit the stored list to the electronic apparatus 100 in response to the request from the electronic apparatus 100.

The electronic apparatus 100 may include a chat room generation device 132.

The chat room generation device 132 may receive N content lists and N channel lists from the external server 300. The chat room generation device 132 may acquire at least one of the popular content or the popular channel by analyzing the list. The chat room generation device 132 may determine the target content based on at least one of the popular content or the popular channel. The chat room generation device 132 may store at least one of the popular content or the popular channel in the information collection device 131.

The chat room generation device 132 may generate the chat room based on at least one of the popular content or the popular channel, stored in the information collection device 131.

The chat room generation device 132 may identify a current day (or today's day) (S2005). The chat room generation device 132 may acquire the N content and the N channels corresponding to the current day (S2010). The chat room generation device 132 may identify the target content among the N content (S2015). The chat room generation device 132 may determine the target content in consideration of the popular content and the popular channel, stored in the information collection device 131.

The chat room generation device 132 may perform analysis operations on the N channels. The chat room generation device 132 may determine whether the target content is identified in an i-th channel (S2020).

Based on the target content not being identified in the i-th channel (S2020-N), the chat room generation device 132 may perform the analysis operation on the next channel (S2025).

Based on the target content being identified in the i-th channel (S2020-Y), the chat room generation device 132 may determine whether the i-th channel may be provided by the user terminal device (S2030).

Based on the user terminal device (S2030-N) being unable to provide the i-th channel, the chat room generation device 132 may perform the analysis operation on the next channel (S2025).

Based on the user terminal device (S2030-Y) being able to provide the i-th channel, the chat room generation device 132 may determine whether the analysis operations on all the channels is performed (S2035). Based on the analysis operations on all the channels not being performed (S2035-N), the chat room generation device 132 may perform the analysis operation on the next channel (S2025).

Based on the analysis operations on all the channels being performed (S2035-Y), the chat room generation device 132 may acquire the broadcast time of the target content able to be provided by the user terminal device (S2040).

For example, out of 100 channels, there may be 50 channels that broadcast the target content. Only 10 channels out of 50 channels may be provided by the user terminal device. The chat room generation device 132 may acquire the broadcast time in which the target content is provided in 10 channels.

The chat room generation device 132 may generate the chat room based on the broadcast time (S2045).

The electronic apparatus 100 may acquire the broadcast schedule information. The electronic apparatus 100 may provide the chat service related to the target content based on the acquired broadcast schedule information. The target content may be directly selected by the user. The target content may be automatically selected based on the viewer rating information. The electronic apparatus 100 may generate (or reserve) the chat room for the target content. The electronic apparatus 100 may provide the chat room to the user at a broadcast time in which the target content may be provided.

According to various embodiments, the electronic apparatus 100 may provide the chat service based on control command information transmitted from the external server 300. The control command information may include a command for starting the chat service and information related to the chat service. The information related to the chat service may include at least one of the target content, a chat service time, or chat service configuration information. The chat service time may include at least one of a service start time and/or a service end time. The chat service configuration information may include a chat room type, a limited number of people in chat room, or the like. The external server 300 may transmit the control command information to at least one electronic apparatus that may be connected to the external server 300. The electronic apparatus 100 may provide the chat service based on the control command information received from the external server 300.

For example, a manager of the external server 300 may request the chat service related to the target content from the electronic apparatus 100. The external server 300 may transmit the control command information related to information directly set by the manager to the electronic apparatus 100.

For example, the target content may be content that is unable to be directly provided by the electronic apparatus 100. The electronic apparatus 100 may acquire information necessary to provide the target content through the external server 300.

The control command information may further include source data of the target content. The electronic apparatus 100 may acquire source data of target content based on a control command received from the external server 300, and the electronic apparatus 100 may provide the target content.

The control command information may include the address information for accessing the target content. The electronic apparatus 100 may connect to (or access) the internet address for providing the target content based on the address information received from the external server 300. The electronic apparatus 100 may receive (or acquire) the target content from the internet address connected thereto.

Figure 21:
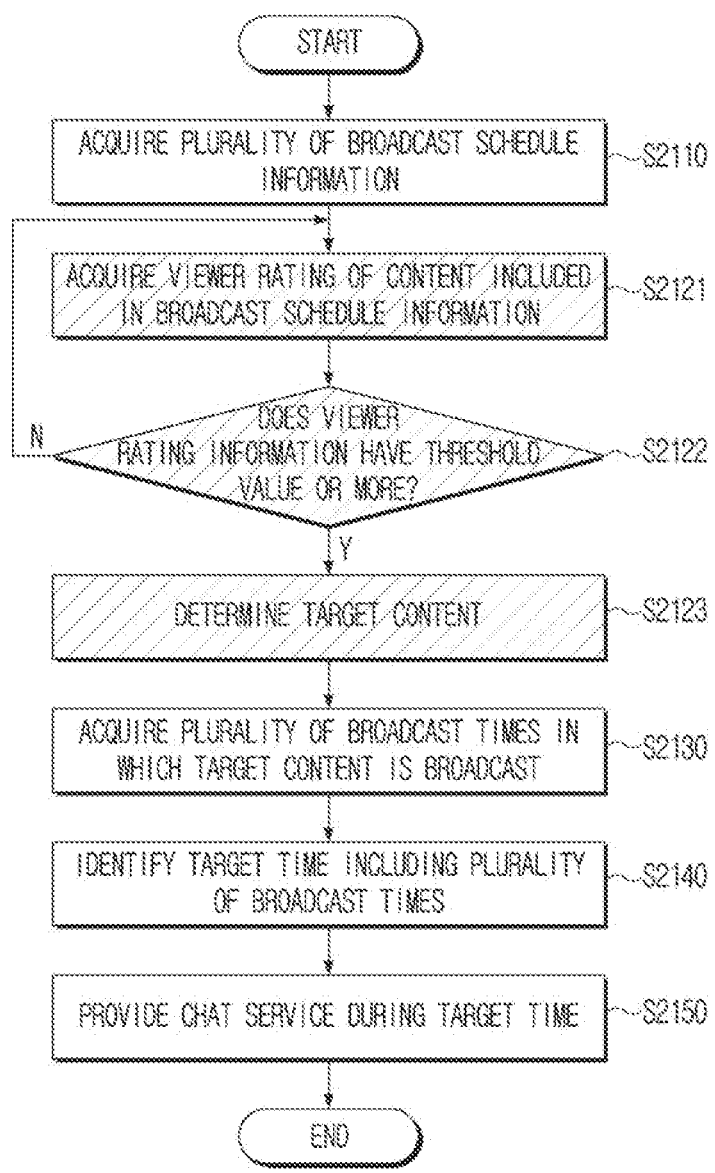
FIG. 21 is a flowchart for explaining an operation of determining the target content by using viewer rating information.

FIG. 21 is a flowchart for explaining an operation of determining the target content by using the viewer rating information.

The steps S2110, S2130, S2140, and S2150 of FIG. 21 may correspond to the steps S410, S430, S440, and S450 of FIG. 4. Therefore, their redundant descriptions are omitted.

After acquiring the broadcast schedule information, the electronic apparatus 100 may acquire the viewer rating of the content included in the broadcast schedule information (S2121). The viewer rating information may be included in the broadcast schedule information. The viewer rating information may include a value acquired from the external server 300.

The electronic apparatus 100 may acquire the viewer rating of the first content among the plurality of content.

The electronic apparatus 100 may determine whether the viewer rating information has the threshold value or more (S2122). The threshold value may be a predetermined value, and may be changed based on the user setting.

The electronic apparatus 100 may determine whether the viewer rating information has the threshold value or more during a predetermined time. The predetermined time may be changed based on the user setting. There may occur a case where the viewer rating has the threshold value or more based on a temporary data measurement or a data measurement error. It may be unnecessary to provide the chat service even for such a temporary event (or phenomenon). The electronic apparatus 100 may determine whether the viewer rating has the threshold value or more continuously (or consecutively) for the predetermined time.

The first threshold value may be used for a determination operation without considering the predetermined time. The second threshold value may be used for a determination operation considering the predetermined time. The first threshold value and the second threshold value may be different from each other.

Based on the viewer rating of the first content being less than the threshold value (S2122-N), the electronic apparatus 100 may repeat the steps S2121 and S2122.

Based on the viewer rating of the first content having the threshold value or more (S2122-Y), the electronic apparatus 100 may determine the first content as the target content (S2123). The electronic apparatus 100 may then perform the steps S2130, S2140, and S2150.

Figure 22:
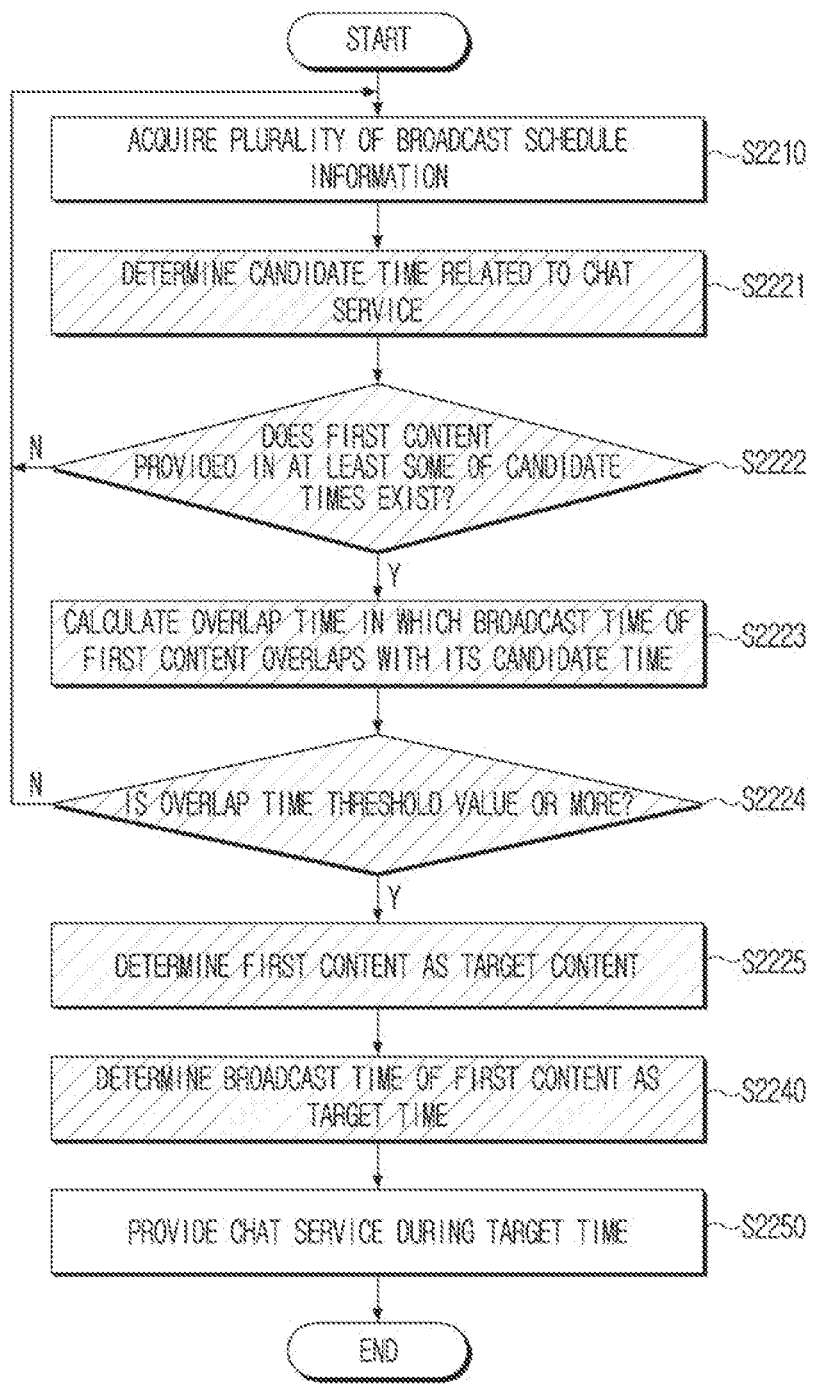
FIG. 22 is a flowchart for explaining an operation of comparing the candidate time with a broadcast time.

FIG. 22 is a flowchart for explaining an operation of comparing the candidate time with the broadcast time.

The steps S2210 and S2250 of FIG. 22 may correspond to the steps S410 and S450 of FIG. 4. Therefore, their redundant descriptions are omitted.

After acquiring the broadcast schedule information, the electronic apparatus 100 may determine the candidate time related to the chat service (S2221). The candidate time may be a time determined in the predetermined manner in relation to a past chat service history. The candidate time may be a time predicted to be suitable for providing the chat service.

The electronic apparatus 100 may determine whether the first content provided in at least some of the candidate times exists (S2222).

Based on the first content not existing (S2222-N), the electronic apparatus 100 may repeat the steps S2210, S2221, and S2222.

Based on the first content existing (S2222-Y), the electronic apparatus 100 may calculate an overlap time in which the broadcast time of the first content overlaps with its candidate time (S2223).

The electronic apparatus 100 may determine whether the overlap time is the threshold value or more (S2224). The threshold value may be changed based on the user setting.

Based on the overlap time being less than the threshold value (S2224-N), the electronic apparatus 100 may repeat the steps S2210, S2221, S2222, S2223, and S2224.

Based on the overlap time being the threshold value or more (S2224-Y), the electronic apparatus 100 may determine the first content as the target content (S2225).

The electronic apparatus 100 may determine the broadcast time of the first content as the target time (S2240). The electronic apparatus 100 may provide the chat service during the target time (S2250).

In some embodiments, the electronic apparatus 100 may perform the comparison operation of the candidate time and the broadcast time based on weekly broadcast schedule information.

In some embodiments, the electronic apparatus 100 may perform the comparison operation of the candidate time and the broadcast time based on daily broadcast schedule information.

In some embodiments, the electronic apparatus 100 may perform the comparison operation of the candidate time and the broadcast time based on hourly broadcast schedule information.

In some embodiments, the electronic apparatus 100 may perform the comparison operation of the candidate time and the broadcast time based on broadcast schedule information in a predetermined time unit (or a time unit set by the user).

Figure 23:
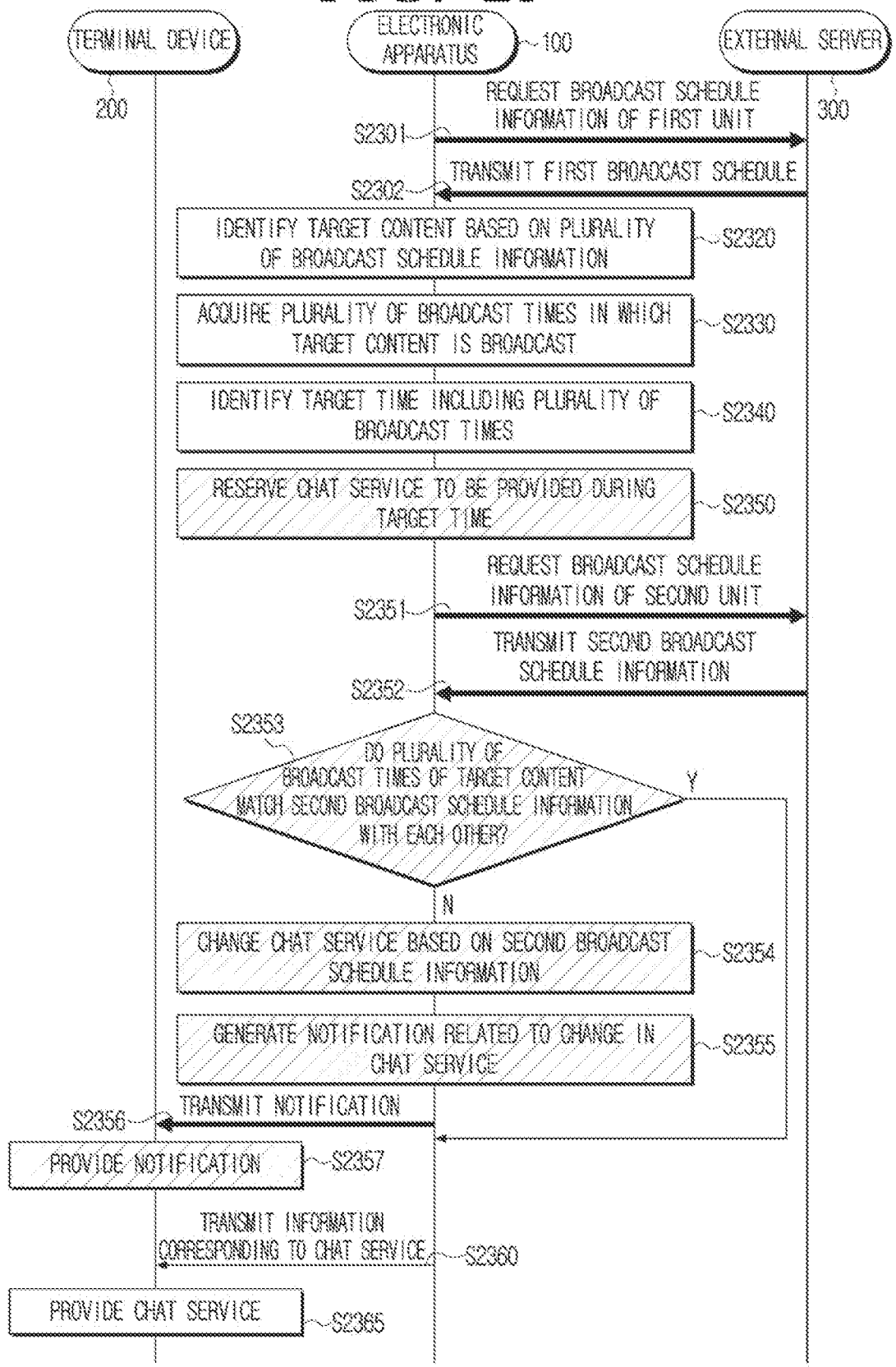
FIG. 23 is a flowchart for explaining an operation of updating the chat service.

FIG. 23 is a flowchart for explaining an operation of updating the chat service.

The steps S2320, S2330, S2340, S2360, and S2365 of FIG. 23 may correspond to the steps S1120, S1130, S1140, S1160, and S1165 of FIG. 11. Therefore, their redundant descriptions are omitted.

The electronic apparatus 100 may request the broadcast schedule information of a first unit from the external server 300 (S2301). The first unit may be weekly or monthly.

The external server 300 may transmit the first broadcast schedule information to the electronic apparatus 100 in response to the request from the electronic apparatus 100 (S2302).

The electronic apparatus 100 may perform the steps S2320, S2330, and S2340 based on the first broadcast schedule information. The electronic apparatus 100 may reserve the chat service to be provided during the target time (S2350). The electronic apparatus 100 may generate the chat room in advance in relation to the chat service. The electronic apparatus 100 may allow the access to the chat room only during the target time.

According to various embodiments, based on any user accessing (or connecting to) a pre-generated chat room, the electronic apparatus 100 may provide a guide UI indicating that the chat service does not start. The guide UI may include at least one of text (or image) information indicating that the chat service does not start, current time information, information on a time the chat service starts, or a notification UI for selecting whether to provide a notification based on the chat service starting. Based on the user input for receiving the notification being received through the notification UI, the electronic apparatus 100 may provide the notification information (or a notification message) at the chat service start time.

Based on the predetermined event occurring, the electronic apparatus 100 may request the broadcast schedule information of a second unit from the external server 300 (S2351). The second unit may be daily.

The external server 300 may transmit the second broadcast schedule information to the electronic apparatus 100 in response to the request from the electronic apparatus 100 (S2352).

The electronic apparatus 100 may update the reserved chat service based on the second broadcast schedule information received from the external server 300.

The electronic apparatus 100 may determine whether the plurality of broadcast times of the target content match the second broadcast schedule information (S2353). The plurality of broadcast times of the target content may be a time in which the reserved chat service is provided.

Based on the plurality of broadcast times of the target content and the second broadcast schedule information not matching each other (S2353-N), the electronic apparatus 100 may change the chat service based on the second broadcast schedule information (S2354). The electronic apparatus 100 may change the previously reserved (or set) target time based on the recently received second broadcast schedule information.

The electronic apparatus 100 may prepare the chat service in advance based on the broadcast schedule information of the first unit, and update the existing chat service by using the broadcast schedule information of the second unit. The electronic apparatus 100 may provide the chat service to the user at an accurate time.

Based on the chat service being changed, the electronic apparatus 100 may generate a notification related to the change in the chat service (S2355). The electronic apparatus 100 may transmit the generated notification to the terminal device 200 (S2356).

The terminal device 200 may provide the notification received from the electronic apparatus 100 (S2357). The terminal device 200 may display a screen including text information indicating that the time related to the chat service is changed.

According to various embodiments, the electronic apparatus 100 may provide the notification related to the chat service through the electronic apparatus 100. Assume that the electronic apparatus 100 includes an output device including at least one of the display or the speaker. The electronic apparatus 100 may provide the notification through its own output device.

Based on the plurality of broadcast times of the target content and the second broadcast schedule information matching each other (S2353-Y), the electronic apparatus 100 may perform the steps S2360 and S2365.

According to various embodiments, the electronic apparatus 100 may generate a new chat service without changing the existing reserved chat service. The electronic apparatus 100 may acquire a new target time based on the second broadcast schedule information and generate information related to the new chat service based on the acquired target time.

The electronic apparatus 100 may delete the information related to the existing chat service. The electronic apparatus 100 may delete the previously-generated chat room.

FIG. 23 shows that the broadcast schedule information of the second unit is requested from the external server 300 in the step S2351.

According to various embodiments, the second broadcast schedule information may be received from the external server 300 without any request from the electronic apparatus 100, such as in the step S2351. The electronic apparatus 100 may perform the steps S2353, S2354, S2355, S2356, S2357, S2360, and S2365 based on the received second broadcast schedule information.

Figure 24:
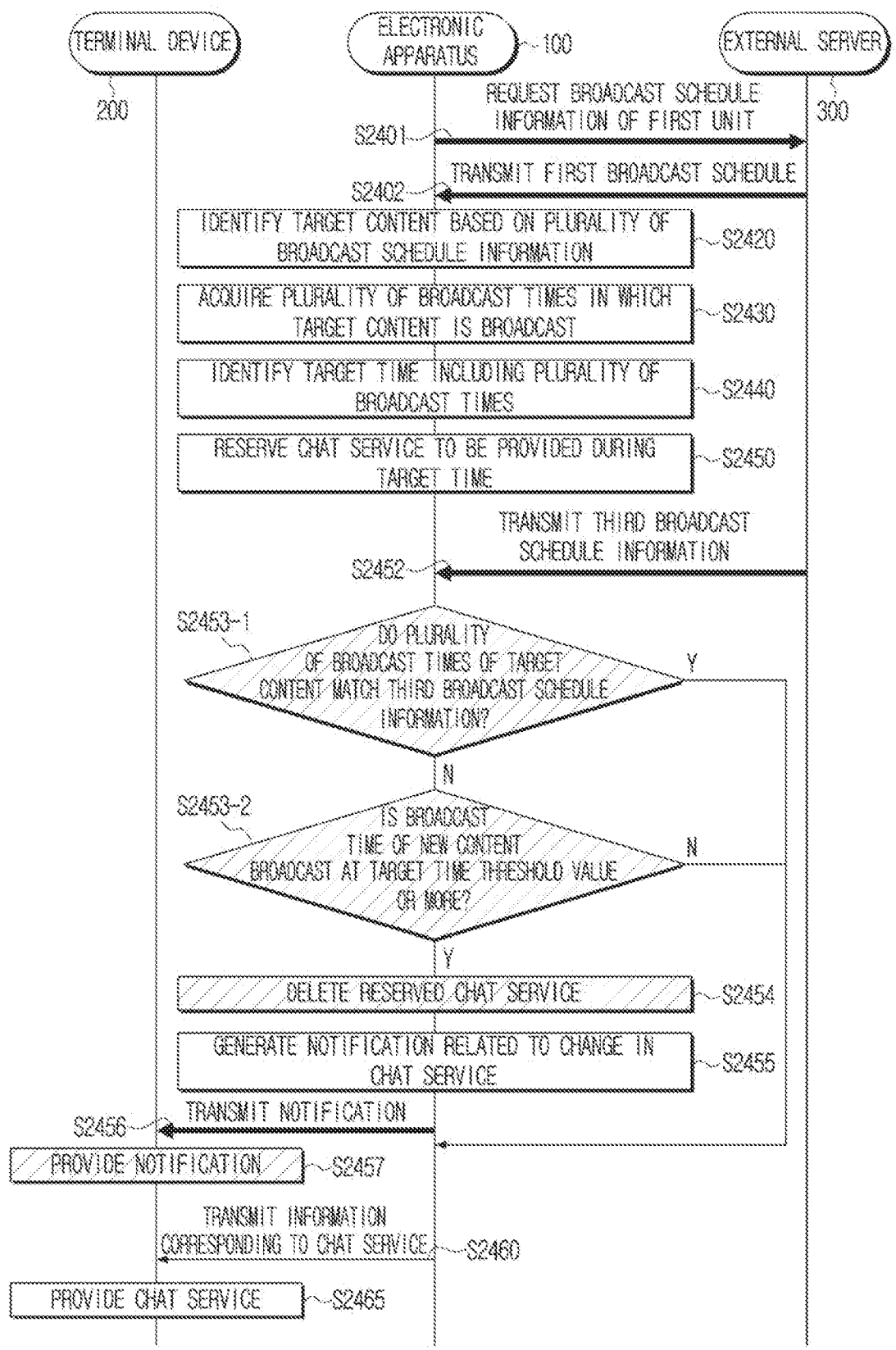
FIG. 24 is a flowchart for explaining an operation of deleting the chat service.

FIG. 24 is a flowchart for explaining an operation of deleting the chat service.

The steps S2401, S2402, S2420, S2430, S2440, S2450, S2455, S2456, S2457, S2460, and S2465 of FIG. 24 may correspond to the steps S2301, S2302, S2320, S2330, S2340, S2350, S2355, S2356, S2357, S2360, and S2365 of FIG. 23. Therefore, their redundant descriptions are omitted.

The external server 300 may transmit third broadcast schedule information including new content to the electronic apparatus 100 (S2452). The electronic apparatus 100 may acquire the third broadcast schedule information. The third broadcast schedule information may be information of a third unit.

The third unit may be a unit indicating one-time content provision rather than a daily unit. For example, content such as the disaster broadcast or emergency news may be content corresponding to a schedule of the third unit.

The electronic apparatus 100 may determine whether the plurality of broadcast times of the target content match the third broadcast schedule information (S2453-1).

Based on the plurality of broadcast times of the target content and the second broadcast schedule information matching each other (S2453-1-Y), the electronic apparatus 100 may perform the steps S2460 and S2465.

Based on the plurality of broadcast times of the target content and the third broadcast schedule information not matching each other (S2453-1-N), the electronic apparatus 100 may determine whether the broadcast time of the new content broadcast at the target time is the threshold value or more (S2453-2).

Based on the broadcast time of the new content broadcast at the target time being less than the threshold value (S2453-2-N), the electronic apparatus 100 may perform the steps S2460 and S2465.

Based on the broadcast time of the new content broadcast at the target time being the threshold value or more (S2453-2-Y), the electronic apparatus 100 may delete the reserved chat service (S2454). The electronic apparatus 100 may then perform the steps S2455, S2456, S2457, S2460, and S2465.

According to various embodiments, the electronic apparatus 100 may receive a signal (or data) indicating a disaster situation, an emergency situation, or the like. The electronic apparatus 100 may receive the signal for notifying the disaster situation or the emergency situation through the external device (or the external server).

For example, the external device may be an apparatus related to the manager providing the chat service. After recognizing the disaster situation or the emergency situation, the manager may register the same on a server of the manager. The manager may transmit a broadcast for notifying the disaster situation or the emergency situation to the terminal device (e.g., TV) registered on the server.

In case of receiving the signal for notifying the disaster situation or the emergency situation, the electronic apparatus 100 may immediately perform the steps S2454 and S2455 without checking the broadcast time as in the step S2453-2.

In case of receiving the signal for notifying the disaster situation or the emergency situation, the electronic apparatus 100 may perform the steps S2454 and S2455 in consideration of the broadcast time. The step S2453-2 may also be performed based on the electronic apparatus 100 receiving the signal indicating the disaster situation or the emergency situation.

According to various embodiments, the electronic apparatus 100 may be connected to the terminal device 200. The terminal device 200 may transmit a text message (or text information) to the electronic apparatus 100 in real time. The electronic apparatus 100 may determine whether a corresponding situation is the disaster situation or the emergency situation by analyzing the text message received from the terminal device 200.

The electronic apparatus 100 may pre-store at least one predetermined word indicating the disaster situation or the emergency situation. The electronic apparatus 100 may determine whether the predetermined word is included in the text message received from the terminal device 200.

The electronic apparatus 100 may acquire similarity by comparing at least one word included in the text message with at least one predetermined word. Based on the similarity having the threshold value or more, the electronic apparatus 100 may identify an event in which the disaster situation or the emergency situation occurs.

In case of identifying the event in which the disaster situation or the emergency situation occurs, the electronic apparatus 100 may immediately perform the steps S2454 and S2455 without checking the broadcast time as in the step S2453-2.

In case of identifying the event in which the disaster situation or the emergency situation occurs, the electronic apparatus 100 may perform the steps S2454 and S2455 in consideration of the broadcast time. The step S2453-2 may be performed also based on the electronic apparatus 100 receiving the signal indicating the disaster situation or the emergency situation.

The disaster situation may be described as a disaster broadcast or the like, and the emergency situation may be described as an emergency broadcast or the like.

Figure 25:
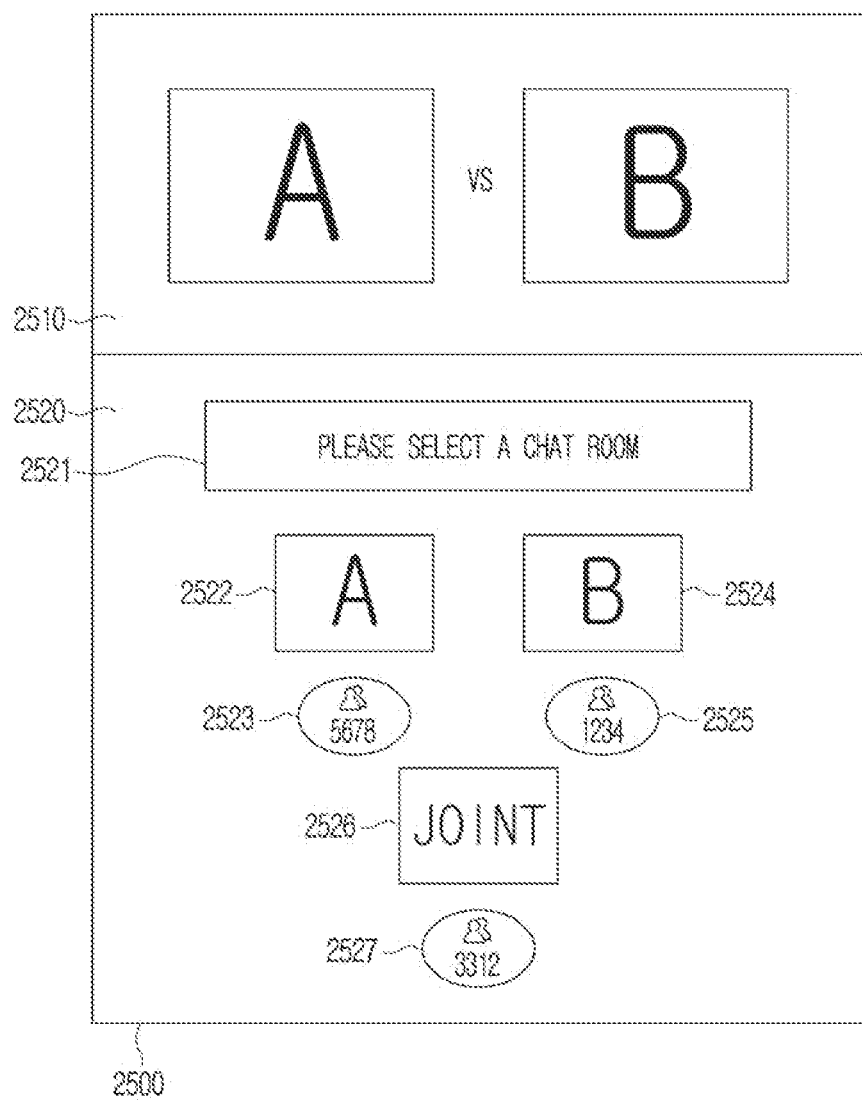
FIG. 25 is a view for explaining a screen for selecting a chat room.

FIG. 25 is a view for explaining a screen for selecting the chat room.

Referring to FIG. 25, a screen 2500 guiding the plurality of chat rooms may be provided. The screen 2500 may include at least one of a first region 2510 or a second region 2520.

The first region 2510 may be a region for displaying the content. The electronic apparatus 100 may acquire information related to the target content. The electronic apparatus 100 may acquire the information related to the target content from the terminal device 200 or the external server 300. The information related to the target content may be a plurality of image frames of the target content itself.

The electronic apparatus 100 may determine whether the predetermined event is identified by analyzing the image frame displayed in the first region 2510. The predetermined event may be an event in which sports content or competition content is displayed. The electronic apparatus 100 may determine whether the predetermined event is identified in the target content by using the OCR, the ACR, or the like.

Based on the predetermined event being identified in the target content, the electronic apparatus 100 may acquire the number of teams in a competition situation. The electronic apparatus 100 may generate the chat rooms as many as the number of acquired teams. FIG. 25 assumes that two teams are identified.

The electronic apparatus 100 may provide the user with a UI guiding which chat room to select among the plurality of generated chat rooms.

The second region 2520 may include the guide UI. The second region 2520 may include at least one of information 2521 requesting to select the chat room, a UI 2522 indicating the chat room related to a first team, a UI 2523 indicating the number of users accessing the chat room of the first team, a UI 2524 indicating the chat room related to a second team, a UI 2525 indicating the number of users accessing the chat room of the second team, a UI 2526 indicating the chat room related to a joint team (or a joint cheering), or a UI 2527 indicating the number of users accessing the chat room of the joint team.

In case of receiving the user input through the UI 2522 indicating the chat room related to the first team, the electronic apparatus 100 may provide the chat room related to the first team.

In case of receiving the user input through the UI 2524 indicating the chat room related to the second team, the electronic apparatus 100 may provide the chat room related to the second team.

In case of receiving the user input through the UI 2526 indicating the chat room related to the joint team, the electronic apparatus 100 may provide the chat room related to the joint team. In the chat room related to the joint team, the electronic apparatus 100 may receive information on a preferred team after the user enters the chat room. In case of receiving information on the preferred team of a specific user, the electronic apparatus 100 may provide a visual effect (or visual UI) corresponding to the preferred team.

The electronic apparatus 100 may provide a text (or chat) of the user who selects the first team in a first color (or a first icon).

The electronic apparatus 100 may provide a text (or chat) of the user who selects the second team in a second color (or a second icon).

Even after accessing the chat room for a specific team, the user may still access the chat room of a different team. For example, based on the specific user who selects the first team selecting the second team in the provided service screen, the electronic apparatus 100 may allow the specific user to be removed from the chat room related to the first team, and to access the chat room related to the second team. The electronic apparatus 100 may move the specific user to the chat room corresponding to a selected team.

Unlike in FIG. 25, the electronic apparatus 100 may provide the chat service without distinguishing the teams. The electronic apparatus 100 may provide a UI for the user to directly select a team in the chat service. In one chat service, the electronic apparatus 100 may visually distinguish the users based on their selected teams. For example, the electronic apparatus 100 may distinguish the users by using the colors or the icons, corresponding to the selected teams.

The electronic apparatus 100 may provide the text (or the chat) of the user who selects the first team in the first color (or the first icon).

The electronic apparatus 100 may provide the text (or the chat) of the user who selects the second team in the second color (or the second icon).

Figure 26:
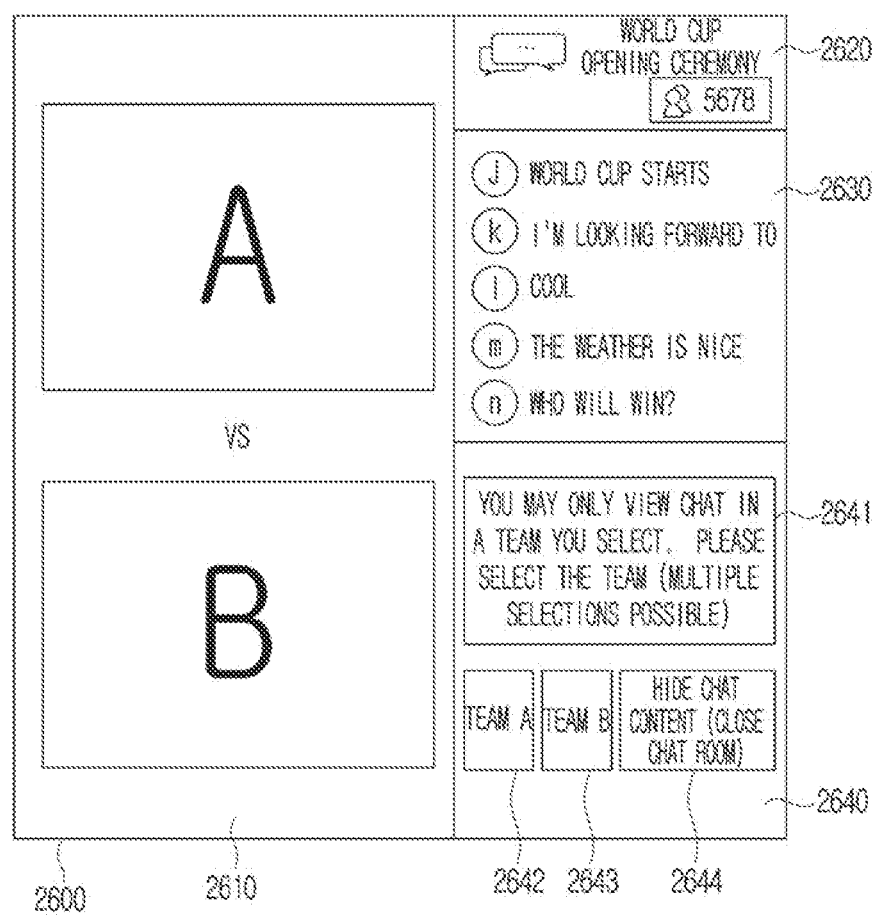
FIG. 26 is a view for explaining a screen displaying some chats based on user selection.

FIG. 26 is a view for explaining a screen displaying some chats based on the user selection.

Referring to FIG. 26, a screen 2600 may include at least one of a first region 2610, a second region 2620, a third region 2630, or a fourth region 2640.

The first region 2610 may be a region for displaying the content.

The second region 2620 may include at least one of the name of the selected chat room or the number of connected users.

The third region 2630 may include the user conversation input into the selected chat room.

The fourth region 2640 may include guide information for displaying only the chat about the team selected by the user in the chat displayed in the third region 2630.

The fourth region 2640 may include at least one of a guide text 2641 or UIs 2642, 2643, and 2644 for the selection.

The guide text 2641 may include information indicating that only the chat of the selected teams may be displayed.

In case of receiving the user input for selecting the UI 2642, the electronic apparatus 100 may provide the chat service in which only the chats of the users who select the team corresponding to the UI 2642 are displayed in the third region 2630.

In case of receiving the user input for selecting the UI 2643, the electronic apparatus 100 may provide the chat service in which only the chats of the users who select the team corresponding to the UI 2643 are displayed in the third region 2630.

In case of receiving the user input for selecting the UI 2644, the electronic apparatus 100 may not display any chat in the third region 2630. The electronic apparatus 100 may hide chat content or not display a UI corresponding to the chat room.

A function of selectively displaying the chat for each team may be described as a team filtering function.

According to various embodiments, the electronic apparatus 100 may perform a language filtering function and a country filtering function.

The language filtering function may display only a language selected by the user or remove the language selected by the user.

The electronic apparatus 100 may acquire language information (or a basic language) included in a basic setting of the user. The electronic apparatus 100 may perform a function of automatically translating the chat input in a language other than the basic language into the basic language. The electronic apparatus 100 may provide a UI for selecting whether to perform the automatic translation function. Based on the user input acquired through the UI, the electronic apparatus 100 may provide a service by automatically translating the chat input in the language other than the basic language into the basic language.

The country filtering function may be a function of displaying only the user chat in a country selected by the user or removing the user chat in the country selected by the user. The electronic apparatus 100 may preferentially provide a service displaying only the chat corresponding to the country information included in the basic setting of the user.

In case of identifying as providing the chat room service related to the content of a predetermined type, the electronic apparatus 100 may provide the service by distinguishing a mode (or a first type chat room) for displaying only the chat corresponding to a basic country and a mode (or a second type chat room) for displaying the chat corresponding to all the countries from each other. The predetermined type may be a national sports event type. The content of the predetermined type may be content related to at least one of the World Cup, Olympic Games, World Championships, continental sports competitions, or national sports competitions.

The electronic apparatus 100 may provide a screen including a UI for selecting one of the mode (or the first type chat room) for displaying only the chat corresponding to the basic country and the mode (or the second type chat room) for displaying the chat corresponding to all the countries. The electronic apparatus 100 may perform a change from the mode (or the first type chat room) for displaying only the chat corresponding to the basic country to the mode (or the second type chat room) for displaying the chat corresponding to all the countries based on the user input. The electronic apparatus 100 may perform a change vice versa.

The electronic apparatus 100 may provide a UI related to the filtering function in the fourth region 2640.

Figure 27:
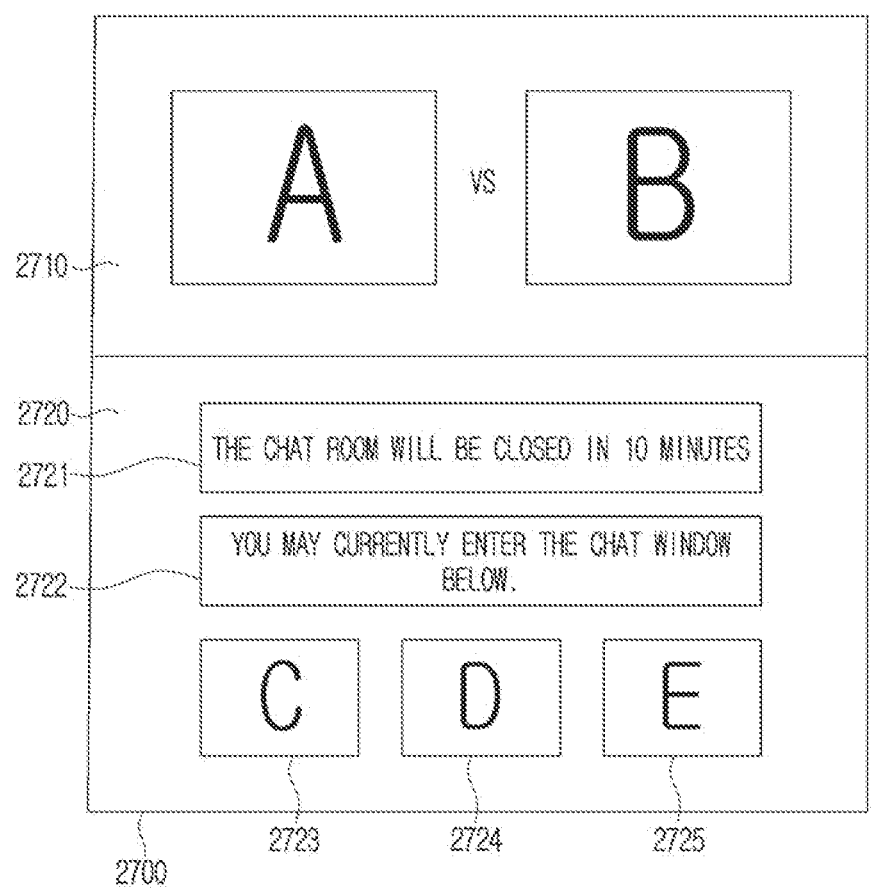
FIG. 27 is a view for explaining a screen guiding the chat room related to content other than the target content.

FIG. 27 is a view for explaining a screen guiding the chat room related to content other than the target content.

A screen 2700 of FIG. 27 may include at least one of a first region 2710 or a second region 2720.

The first region 2710 may be a region for displaying the content.

The second region 2720 may be a region for guiding another chat room.

In case of identifying the predetermined event, the electronic apparatus 100 may provide a screen guiding another chat room. The predetermined event may include an event in which a current chat service (or chat room) ends or an event in which a current time point is less than the threshold time from the end time point.

The second region 2720 may include at least one of a UI 2721 indicating the end time of the chat service, a UI 2722 indicating the new chat service, or UIs 2723, 2724, and 2725 indicating the chat service which may currently be provided. The UIs 2723, 2724, and 2725 may be UIs related to recommended chat rooms.

For example, based on the target content corresponding to consecutive series content, the UIs 2723, 2724, and 2725 may be the chat service related to the next series. The electronic apparatus 100 may display a UI for accessing the chat service related to the next series. The electronic apparatus 100 may determine the plurality of content corresponding to the series as the target content.

Assume that the consecutive series content includes first content, second content, third content, and fourth content. Assume that the first content is determined as the target content, and provided is the first chat room corresponding to the first content. In case of identifying an event in which the first chat room ends, the electronic apparatus 100 may provide a guide UI for accessing the second chat room corresponding to the second content.

For example, based on the target content corresponding to the sports content, the UIs 2723, 2724, and 2725 may be the chat services related to the sports content of the same or similar genre.

For example, assume that 8 baseball teams are simultaneously playing games, and 4 games are simultaneously played. Assume that the other three games are played at a time point in which the game that the user is currently watching ends. The electronic apparatus 100 may guide the chat room services related to the other three games by using the UIs 2723, 2724, and 2725. The user may access the chat rooms for the other games by using the UIs 2723, 2724, and 2725.

According to various embodiments, the electronic apparatus 100 may provide the screen guiding another chat room by using a category related to the target content. The electronic apparatus 100 may provide the UIs 2723, 2724, and 2725 indicating the chat services that may currently be provided using the category related to the target content. The category may include at least one of sports, movies, or dramas. The electronic apparatus 100 may provide the UIs 2723, 2724, and 2725 by using the content (or the chat room service) included in the same category.

According to various embodiments, based on the user setting (e.g., prior consent of the user) existing, the electronic apparatus 100 may automatically provide the recommended chat room.

Figure 28:
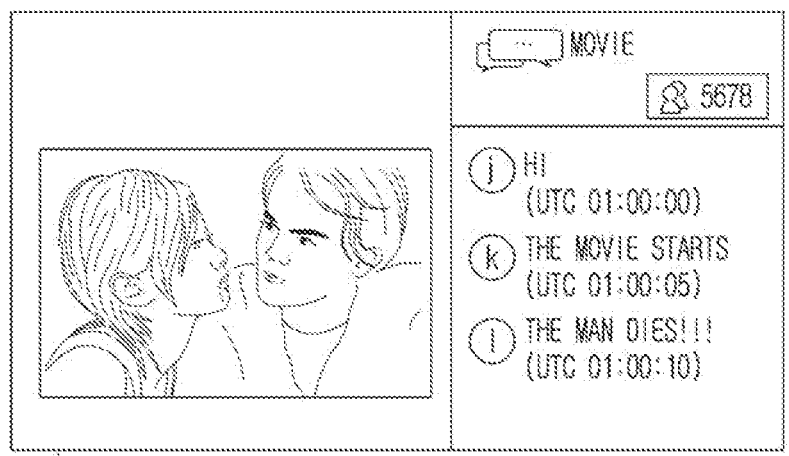
FIG. 28 is a view for explaining a screen displaying chat input during a previous broadcast time.
Figure 28:
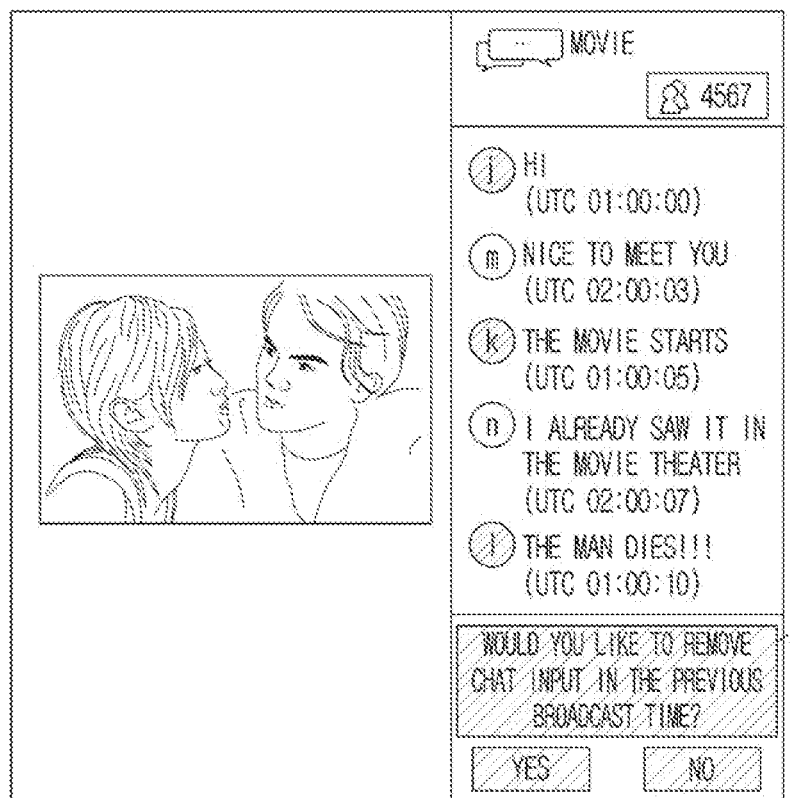

FIG. 28 is a view for explaining a screen displaying the chat input during a previous broadcast time.

FIG. 28 may be related to one or more embodiments of FIG. 8.

Referring to a screen 2810 of FIG. 28, the electronic apparatus 100 may provide the entire chat room during the target time (period) 811 of FIG. 8. The electronic apparatus 100 may store the chat input from 1:00 UTC to 2:00 UTC. The electronic apparatus 100 may provide the stored chat again from 2:00 UTC to 3:00 UTC.

Referring to a screen 2820 of FIG. 28, the electronic apparatus 100 may provide a screen including both the chat input during the previous broadcast time and the chat input during a current broadcast time.

The same content may be broadcast every hour, the electronic apparatus 100 may provide the chat content, input during the previous broadcast time, in the current broadcast time in consideration of a content provision time point.

The electronic apparatus 100 may map the content provision time point and a chat input time point and store the same as chat information. The electronic apparatus 100 may determine at what time point the previously input chat is to be provided based on the stored chat information.

For example, the movie may be provided every hour, the chat input during the previous broadcast time may be provided again after an hour.

The user may view not only the chat that the user currently accesses, but also the chat that the user previously accesses.

The electronic apparatus 100 may provide visual distinction between the chat input during the previous broadcast time and chat input during the current broadcast time. For example, the electronic apparatus 100 may provide a screen displaying different colors, sizes, or the like in consideration of a time in which the chat is input.

The electronic apparatus 100 may provide the chat input during the first broadcast time as the first color, and provide chat input during the second broadcast time as the second color.

The chats may be accumulated as the broadcast time elapses. The electronic apparatus 100 may store the chat input from 1:00 UTC to 2:00 UTC and the chat input from 2:00 UTC to 3:00 UTC. The electronic apparatus 100 may provide the stored chats again from 3:00 UTC to 4:00 UTC.

The screen 2820 may include a guide UI for selecting whether to apply a function of displaying the chat input during the previous broadcast time. The electronic apparatus 100 may determine whether to apply the function of displaying the chat input during the previous broadcast time based on the user input acquired through the guide UI.

According to various embodiments, the entire chat room of FIG. 8 may include the chat content of a past time point, input during the previous broadcast time. There is a possibility that the chat content of the past time point may be the spoiler. The electronic apparatus 100 may perform a function of maintaining the input chat only for the threshold time (for example, one minute), and then deleting the same. Based on the chat being deleted as the threshold time elapses, the spoiler may be prevented for some of the users.

According to various embodiments, the same service (of providing the chat input during the previous broadcast time together) may be provided to the individual chat room (or at the target time 821, 822, 823, 824, or 825) rather than the entire chat room in FIG. 8.

Figure 29:
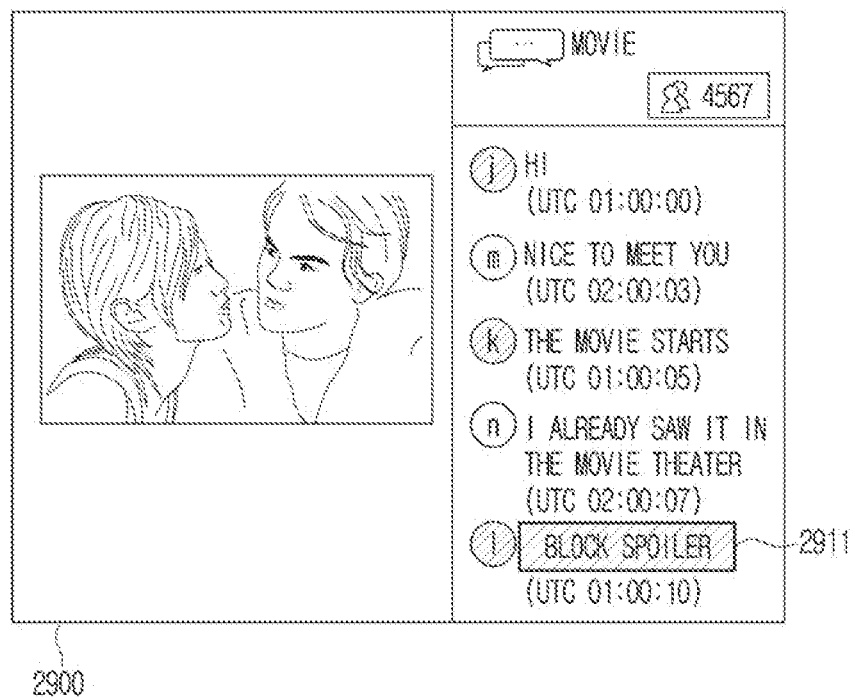
FIG. 29 is a view for explaining an operation of preventing a spoiler.

FIG. 29 is a view for explaining an operation of preventing the spoiler.

A screen 2900 of FIG. 29 may correspond to the screen 2820 of FIG. 28. Therefore, its redundant explanation is omitted.

Assume that the spoiler of the target content exists on the screen 2900. The spoiler may be revealing in advance main content of the target content or content related to its ending.

The electronic apparatus 100 may analyze the chat content to determine whether the chat corresponds to the spoiler.

The spoiler may be described as a word related to the predetermined word, the ending, or the like.

Based on the chat displayed on the screen 2900 being identified as being the spoiler, the electronic apparatus 100 may remove the chat or perform a blurring operation on the chat. The blurred chat is not easily readable by the user.

The electronic apparatus 100 may provide a predetermined UI 2911 to remove or blur the corresponding chat.

Figure 30:
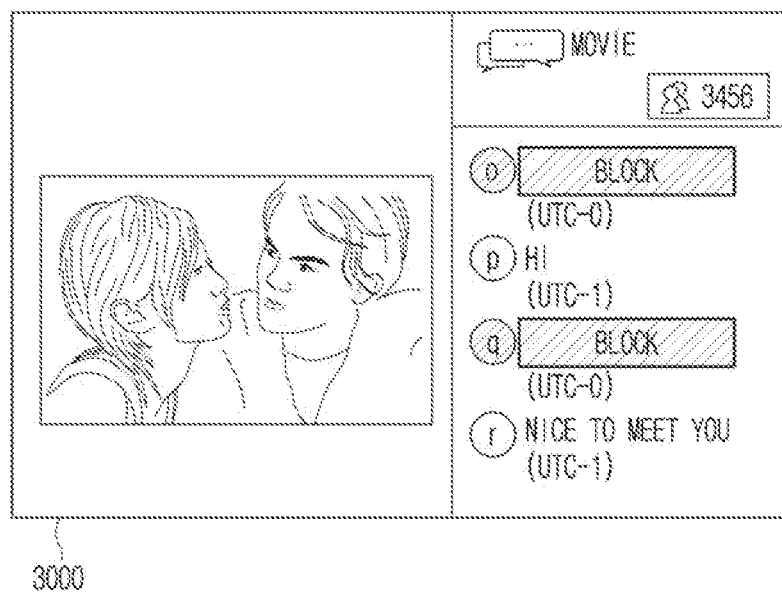
FIG. 30 is a view for explaining an operation of restricting chat input from the terminal device in a specific area.

FIG. 30 is a view for explaining an operation of restricting chat input from the terminal device in a specific area.

A screen 3000 of FIG. 30 may be the screen for the entire chat room described with reference to FIG. 8. The electronic apparatus 100 may provide a screen including the chat of the users located in various time zones.

The electronic apparatus 100 may restrict some chats based on the locations of the terminal devices from which the user input is received. The restriction operation may be removing the chat or blurring the chat.

The electronic apparatus 100 may restrict the chat that is input in an area where the target content is broadcast before the current broadcast time. The electronic apparatus 100 may receive location information of the terminal device 200. The electronic apparatus 100 may determine the time zone based on the location information of the terminal device 200.

The electronic apparatus 100 may restrict the chat input from the terminal device based on the location of the terminal device where the chat is input corresponding to an area that precedes the broadcast time in which the target content is currently being provided.

For example, assume that it is currently 2:00 UTC in one or more embodiments of FIG. 8. The target content may be provided in the second time zone (or the UTC-1 time zone). The electronic apparatus 100 may restrict the chat input from the terminal device located in the first time zone (or the UTC-0 time zone).

According to various embodiments, the electronic apparatus 100 may provide a different screen based on the location of the terminal device. The terminal device located in the second time zone (or the UTC-1 time zone) may be provided with a screen to which the restriction operation is applied. The terminal device located in the first time zone (or the UTC-0 time zone) may be provided with a screen to which no restriction operation is applied.

According to various embodiments, the user accessing through the terminal device located in the first time zone (or the UTC-0 time zone) may be excluded from the chat room. The exclusion operation may be an operation of removing the user from the chat room. The chat of the user removed from the chat room may no longer be displayed on the screen.

Figure 31:
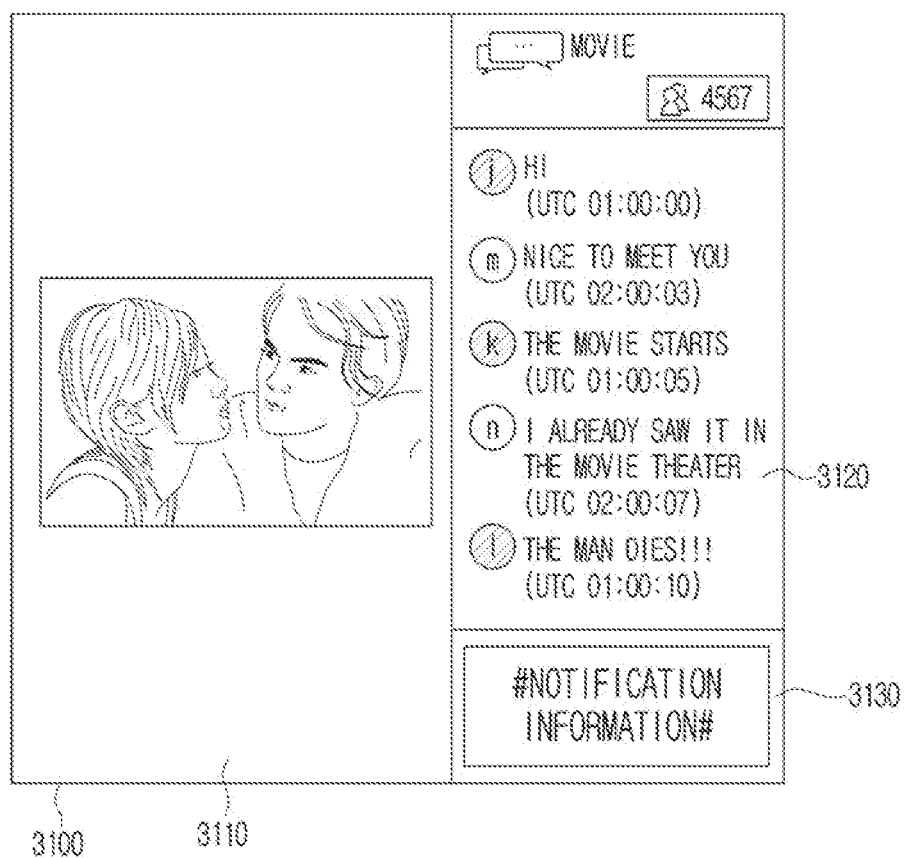
FIG. 31 is a view for explaining an operation of providing notification information.

FIG. 31 is a view for explaining an operation of providing the notification information.

A screen 3100 of FIG. 31 may include at least one of a first region 3110, a second region 3120, or a third region 3130.

The first region 3110 may be a region for displaying the content.

The second region 3120 may be a region for displaying the chat service.

The third region 3130 may be a region for displaying the notification information provided by the electronic apparatus 100.

The information provided by the electronic apparatus 100 may be the advertisement. The electronic apparatus 100 may provide the advertisement together with the chat service.

The electronic apparatus 100 may acquire the location information of the terminal device 200. The electronic apparatus 100 may determine in which time zone the terminal device 200 is located based on the location information. The electronic apparatus 100 may specify the time zone to which the terminal device 200 belongs. The electronic apparatus 100 may identify the advertisement based on the time zone of the specified terminal device 200. The electronic apparatus 100 may identify the advertisement corresponding to the terminal device 200 based on the location information of the terminal device 200. The electronic apparatus 100 may transmit the identified advertisement to the terminal device 200. The terminal device 200 may display the advertisement received from the electronic apparatus 100 in the third region 3130.

Even when the user accesses the same chat room, the provided advertisement may be different based on the location of the terminal device 200.

The electronic apparatus 100 may provide the screen 3100 where the advertisement corresponding to the target content (or the content currently being displayed) is included in the third region 3130. The electronic apparatus 100 may provide the screen 3100 including the advertisement related to the target content. The terminal device 200 may display the screen 3100.

The electronic apparatus 100 may provide the screen 3100 where the advertisement corresponding to the chat room service (or the chat room currently being serviced) is included in the third region 3130. The electronic apparatus 100 may provide the screen 3100 including the advertisement related to the chat room service. The terminal device 200 may display the screen 3100.

According to various embodiments, the notification information provided by the electronic apparatus 100 may be the weather information corresponding to the location of the terminal device 200. The electronic apparatus 100 may identify the weather information corresponding to the location of the terminal device 200. The electronic apparatus 100 may display the identified weather information in the third region 3130.

According to various embodiments, the notification information provided by the electronic apparatus 100 may be the local major notification corresponding to the location of the terminal device 200. The electronic apparatus 100 may identify the local major notification corresponding to the location of the terminal device 200. The electronic apparatus 100 may display the identified local major notification in the third region 3130. Local weather notification may be replaced by local news.

According to various embodiments, the notification information provided by the electronic apparatus 100 may be the viewer rating information. The electronic apparatus 100 may display, in the third region 3130, the viewer rating information of the target content acquired in the previous broadcast time.

According to various embodiments, the notification information provided by the electronic apparatus 100 may be summary information of the target content. The electronic apparatus 100 may display the summary information of the target content in the third region 3130.

In some embodiments, the electronic apparatus 100 may generate the chat room for the target time 911. The electronic apparatus 100 may provide a screen including the notification information at the times (1:00 UTC to 2:00 UTC, 3:00 UTC to 4:00 UTC, and 5:00 UTC to 6:00 UTC) other than the broadcast time. The electronic apparatus 100 may not provide the notification information during the broadcast times (0:00 UTC to 1:00 UTC, 2:00 UTC to 3:00 UTC, and 4:00 UTC to 5:00 UTC). The detailed description of the notification information is described with reference to FIG. 31. The notification information may include at least one of the advertisement, the weather, the local major notification, the viewer rating information, or the content summary information.

In some embodiments, the electronic apparatus 100 may generate the chat room by determining the target time 911, and may limit the access time. The electronic apparatus 100 may generate the chat room during the target time 911 and then block the user access based on the time. For example, the electronic apparatus 100 may provide the chat service to the user during the access permission times (0:00 UTC to 1:00 UTC, 2:00 UTC to 3:00 UTC, and 4:00 UTC to 5:00 UTC). The electronic apparatus 100 may not provide the chat service to the user at the time other than the access permission time even when the chat room is generated.

Figure 32:
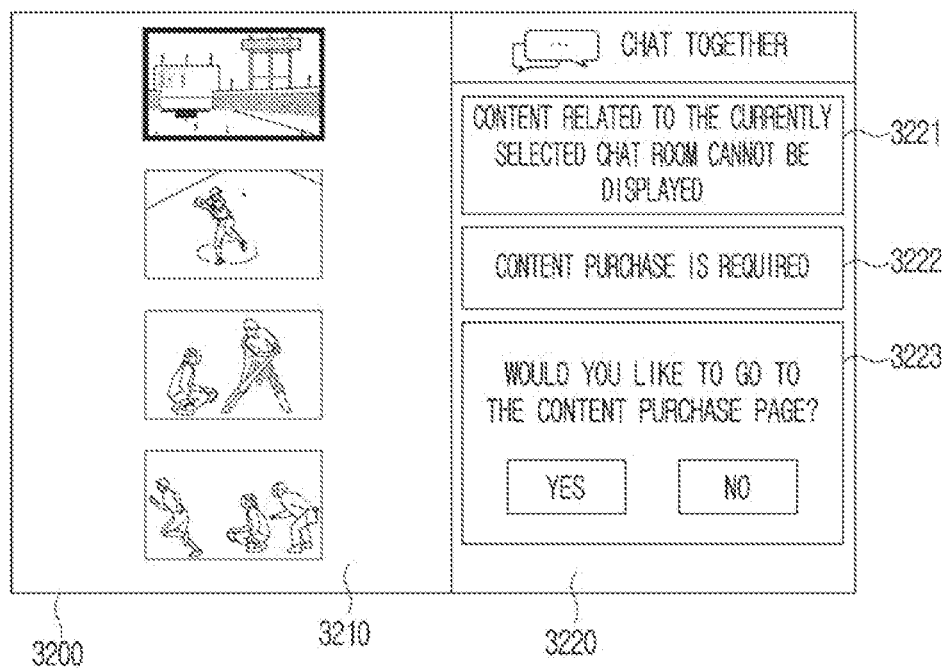
FIG. 32 is a view for explaining an operation of providing content which is unable to be provided by the electronic apparatus or the terminal device.

FIG. 32 is a view for explaining an operation of providing content which is unable to be provided on the electronic apparatus or the terminal device.

Referring to FIG. 32, a screen 3200 may include at least one of a first region 3210 or a second region 3220.

The first region 3210 may be a region for displaying the content. An image displayed in the first region 3210 may include at least one of the thumbnail image or a preview image.

The second region 3220 may include a guide UI for viewing the content corresponding to the selected chat room.

Assume that the user selects one chat room among the plurality of chat rooms. Assume that the content corresponding to the chat room selected by the user is unable to be provided by the terminal device 200.

The electronic apparatus 100 may provide a UI 3221 indicating that the content related to the chat room selected by the user is unable to be displayed.

The electronic apparatus 100 may provide a UI 3222 asking to purchase the content.

The electronic apparatus 100 may provide a UI 3223 guiding purchase of the content.

Based on the user completing purchasing the content, the electronic apparatus 100 may provide at least one of the content or the chat room corresponding to the content.

According to various embodiments, the screen 3200 may include information related to an over the top (OTT) service (or a specific OTT service) rather than the content purchase.

For example, the electronic apparatus 100 may provide a UI including text information "You need to move to OTT" in the second region 3220.

For example, the electronic apparatus 100 may provide a UI including text information "You need to subscribe OTT" in the second region 3220.

According to various embodiments, the electronic apparatus 100 may be connected to the plurality of terminal devices 200. The electronic apparatus 100 may be connected to the first terminal device (e.g., TV) and the second terminal device (e.g., smartphone). Assume that the first terminal device is already logged in to the OTT, and the second terminal device is not logged in to the OTT.

The electronic apparatus 100 may provide the user with a guide screen to log in to the OTT on the second terminal device that is not logged in to the OTT.

For example, the electronic apparatus 100 may transmit, to the first terminal device, a control signal for outputting the screen guiding the user to log in to the OTT on the second terminal device.

For example, the electronic apparatus 100 may transmit, to the second terminal device, the control signal for outputting the screen guiding the user to log in to the OTT on the second terminal device.

The OTT may be described as a content providing enterprise, a content provision service, or the like.

According to various embodiments, the first region 3210 may include at least one image. At least one image may include an image (or a thumbnail image) indicating content related to a current chat room. At least one image may include an image (or a thumbnail image) indicating another content related to the content currently being played.

The first region 3210 may include a list UI including at least one image (or item). Based on one of the images (or items) included in the list UI being selected by the user, guide information for providing content corresponding to the image selected by the user may be provided (or displayed).

The guide information may include information related to a method of playing (or watching) the content. For example, the guide information may include information indicating an application used for playing the content. The guide information may include application information for playing the content. The application information may include at least one of the identification information, installation information, purchase information, or execution information.

The application used for playing the content may be described as a necessary application, an essential application, a target application, or the like.

The electronic apparatus 100 may provide an application screen including the application information.

The application screen may include information indicating whether the necessary application is installed on the electronic apparatus 100 or the terminal device 200.

In some embodiments, unlike the screen 3200 of FIG. 32, while the application screen is displayed, the electronic apparatus 100 may provide the screen related to the chat room. The electronic apparatus 100 may display the screen related to the chat room and the application screen simultaneously on one screen.

In some embodiments, the electronic apparatus 100 may display the application screen by using an additional image (e.g., picture in picture (PIP)). The additional image may be described as a pop-up image. The electronic apparatus 100 may provide the application screen in a PIP format.

For example, the electronic apparatus 100 may first display (or execute) the application screen, and then determine whether the user is logged in to the OTT after the application screen is displayed. Based on the user not being logged in to the OTT, the electronic apparatus 100 may display information requesting the user to log in to the OTT. Based on the user being logged in to the OTT, the electronic apparatus 100 may immediately provide (or play) the content corresponding to the image (or item) selected by the user in the first region 3210. The fact that the user is logged in to the OTT may indicate that the user previously subscribes for the OTT.

For example, the electronic apparatus 100 may first display (or execute) the application screen, and then display information indicating the content corresponding to the image (or item) selected by the user in the first region 3210 after displaying the application screen. The information indicating the content may include the summary information indicating the content. The summary information may include at least one of the content name, the content thumbnail image, a content playing time, a content creator, or a content company. The electronic apparatus 100 may provide (or play) the content in case of receiving the user input for playing the content while the information indicating the content is displayed.

For example, the electronic apparatus 100 may provide the guide information for subscribing the OTT without executing the application when the application screen is first displayed (or executed), and the user is identified as not subscribing for the OTT after the application screen is displayed. The guide information may include information necessary for subscribing the OTT. The guide information may include at least one of an access address for subscribing the OTT or information necessary for the subscription.

Figure 33:
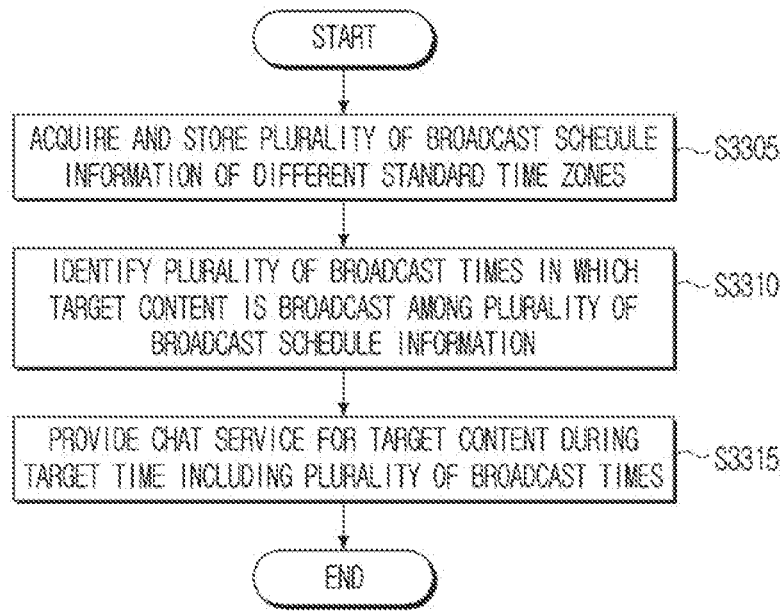
FIG. 33 is a flow chart for explaining a controlling method of an electronic apparatus according to one or more embodiments of the disclosure.

FIG. 33 is a flow chart for explaining a controlling method of an electronic apparatus according to one or more embodiments of the disclosure.

Referring to FIG. 33, the controlling method of an electronic apparatus may include: acquiring and storing a plurality of broadcast schedule information of different standard time zones (S3305); identifying a plurality of broadcast times in which target content is broadcast among the plurality of broadcast schedule information (S3310); and providing a chat service for the target content during a target time including the plurality of broadcast times (S3315).

The controlling method may further include identifying, as the target content, content identified a predetermined number of times or more in the plurality of content included in the plurality of broadcast schedule information.

Meanwhile, the controlling method may further include identifying one target content based on viewer rating information of the plurality of content that is identified the predetermined number of times or more.

The controlling method may further include acquiring first broadcast schedule information and second broadcast schedule information, and identifying the target content included in both the first broadcast schedule information and the second broadcast schedule information, wherein in the identifying of the plurality of broadcast times (S3310), a first broadcast time corresponding to the target content is identified from the first broadcast schedule information, and a second broadcast time corresponding to the target content is identified from the second broadcast schedule information, and in the providing of the chat service (S3315), the chat service for the target content is provided during the target time including the first broadcast time and the second broadcast time.

In the providing of the chat service (S3315), a first start time point and a first end time point, corresponding to the target content, may be acquired based on the first broadcast time, a second start time point and a second end time point, corresponding to the target content, may be acquired based on the second broadcast time, and the chat service may be provided based on the first start time point, the first end time point, the second start time point, and the second end time point.

In the providing of the chat service (S3315), each of the first start time point, the first end time point, the second start time point, and the second end time point may be changed to a reference time point (or a standard time point in a predetermined manner), the target time including all the reference time points changed from at least one of a start point or an end time point may be acquired, and the chat service may be provided during the target time.

The controlling method may further include: generating address information corresponding to the chat service based on the target time; and transmitting the address information corresponding to the chat service to a terminal device.

The controlling method may further include: based on a user input being received from the terminal device, transmitting a first screen related to the chat service to the terminal device; updating the first screen to a second screen based on a user input; and transmitting the second screen updated from the first screen to the terminal device.

The controlling method, in which the electronic apparatus includes a first communication interface and a second communication interface, may further include: transmitting the address information to a first terminal device through the first communication interface; and transmitting the address information to a second terminal device through the second communication interface.

The first communication interface may be a communication interface for processing a radio frequency (RF) signal, and the second communication interface may be a communication interface for processing an internet network signal.

Meanwhile, the methods according to the various embodiments of the disclosure described above may be implemented in the form of an application which may be installed on a conventional electronic apparatus.

In addition, the methods according to the various embodiments of the disclosure described above may be implemented only by the software upgrade or hardware upgrade of the conventional electronic apparatus.

In addition, the various embodiments of the disclosure described above may be performed through an embedded server included in the electronic apparatus, or an external server of at least one of the electronic apparatus or the display device.

Meanwhile, according to the embodiments of the disclosure, the various embodiments described above may be implemented by software including an instruction stored in a machine-readable storage medium (for example, a computer-readable storage medium). A machine may be an apparatus that invokes the stored instruction from the storage medium and is operated based on the invoked instruction, and may include the electronic apparatus in the disclosed embodiments. When the instruction is executed by the processor, the processor may directly perform a function corresponding to the instruction, or other components may perform the function corresponding to the instruction under control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to one or more embodiments of the disclosure, the method according to the various embodiments described above may be provided by being included in a computer program product. The computer program product may be traded as a product between a seller and a purchaser. The computer program product may be distributed in a form of the machine-readable storage medium (for example, a compact disc read only memory (CD-ROM)), or may be distributed online through an application store (for example, PlayStore™). In case of the online distribution, at least a part of the computer program product may be at least temporarily stored or temporarily provided in a storage medium such as a memory of a server of a manufacturer, a server of an application store or a relay server.

In addition, each of the components (for example, modules or programs) according to the various embodiments described above may include a single entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, at least some of the operations may be performed in a different order or be omitted, or other operations may be added.

While certain embodiments of the disclosure has been particularly shown and described, it will be understood that various changes in form and details may be made therein without departing from the spirit and scope of the following claims.

What is claimed is:

1. An electronic apparatus comprising:
at least one memory storing instructions; and
at least one processor operatively connected to the at least one memory, wherein the at least one processor is configured to execute the instructions to:
acquire a plurality of broadcast schedule information of different time zones;
identify a plurality of broadcast times in which target content is broadcast among the plurality of broadcast schedule information;
acquire a first broadcast time corresponding to the target content and a second broadcast time corresponding to the target content, wherein at least a portion of the first broadcast time and the second broadcast time are not overlapping in absolute time; and
provide a chat service for the target content during a target time period including the first broadcast time and the second broadcast time.

2. The electronic apparatus of claim 1, wherein the target content is included a predetermined number of times or more in a plurality of content included in the plurality of broadcast schedule information.

3. The electronic apparatus of claim 2, wherein the at least one processor is further configured to execute the instructions to:
identify the target content based on viewer rating information of the plurality of content that is included the predetermined number of times or more.

4. The electronic apparatus of claim 1, wherein the at least one processor is further configured to execute the instructions to:

acquire first broadcast schedule information and second broadcast schedule information; and acquire the first broadcast time corresponding to the target content from the first broadcast schedule information and the second broadcast time corresponding to the target content from the second broadcast schedule information.

5. The electronic apparatus of claim 4, wherein the at least one processor is further configured to execute the instructions to:

acquire a first start time point and a first end time point, corresponding to the target content, based on the first broadcast time;

acquire a second start time point and a second end time point, corresponding to the target content, based on the second broadcast time; and provide the chat service based on the first start time point, the first end time point, the second start time point, and the second end time point.

6. The electronic apparatus of claim 5, wherein the at least one processor is further configured to execute the instructions to:

change each of the first start time point, the first end time point, the second start time point, and the second end time point to reference time points in a standard time system;

acquire the target time period including all the reference time points; and provide the chat service during the target time period.

7. The electronic apparatus of claim 1, further comprising:
a communication interface,
wherein the at least one processor is further configured to execute the instructions to:
generate address information corresponding to the chat service based on the target time period; and
transmit the address information corresponding to the chat service to a terminal device through the communication interface.

8. The electronic apparatus of claim 7, wherein the at least one processor is further configured to execute the instructions to:

transmit information corresponding to a first screen related to the chat service to the terminal device through the communication interface; and based on receiving a user input from the terminal device, transmit information corresponding to a second screen, updated from the first screen according to the user input, to the terminal device through the communication interface.

9. The electronic apparatus of claim 7,
wherein the communication interface comprises a first communication interface and a second communication interface, and
wherein the at least one processor is further configured to execute the instructions to:
transmit the address information to a first terminal device through the first communication interface; and
transmit the address information to a second terminal device through the second communication interface.

10. The electronic apparatus of claim 7, further comprising:
a display,
wherein the at least one processor is further configured to execute the instructions to:
control the display to display a user interface (UI) related to the chat service output from the terminal device receiving the address information; and based on information corresponding to a user input being received from the terminal device, control the display to display the UI as changed according to the user input.

11. A method of controlling an electronic apparatus, the method comprising:

acquiring a plurality of broadcast schedule information of different time zones;

identifying a plurality of broadcast times in which target content is broadcast among the plurality of broadcast schedule information;

acquiring a first broadcast time corresponding to the target content and a second broadcast time corresponding to the target content, wherein at least a portion of the first broadcast time and the second broadcast time are not overlapping in absolute time; and providing a chat service for the target content during a target time period including the plurality of broadcast times.

12. The method of claim 11, wherein the target content is included a predetermined number of times or more in a plurality of content included in the plurality of broadcast schedule information.

13. The method of claim 12, further comprising:
identifying the target content based on viewer rating information of the plurality of content that is included the predetermined number of times or more.

14. The method of claim 11, further comprising:
acquiring first broadcast schedule information and second broadcast schedule information,
wherein in the identifying of the plurality of broadcast times, the first broadcast time corresponding to the target content is acquired from the first broadcast schedule information and the second broadcast time corresponding to the target content is acquired from the second broadcast schedule information.

15. The method of claim 14, wherein in the providing of the chat service:

a first start time point and a first end time point, corresponding to the target content, are acquired based on the first broadcast time;

a second start time point and a second end time point, corresponding to the target content, are acquired based on the second broadcast time; and the chat service is provided based on the first start time point, the first end time point, the second start time point, and the second end time point.

16. The method of claim 15, wherein in the providing of the chat service:

each of the first start time point, the first end time point, the second start time point, and the second end time point are changed to reference time points in a standard time system;

the target time period including all the reference time points is acquired; and the chat service is provided during the target time period.

17. The method of claim 11, further comprising:
generating address information corresponding to the chat service based on the target time period; and
transmitting the address information corresponding to the chat service to a terminal device.

18. The method of claim 17, further comprising:
transmitting information corresponding to a first screen related to the chat service to the terminal device; and
based on receiving a user input from the terminal device, transmitting information corresponding to a second screen, updated from the first screen according to the user input, to the terminal device.

19. The method of claim 17, further comprising:
transmitting the address information to a first terminal device through a first communication interface; and
transmitting the address information to a second terminal device through a second communication interface.

20. The method of claim 17, further comprising:
displaying a user interface (UI) related to the chat service output from the terminal device receiving the address information; and
based on information corresponding to a user input being received from the terminal device, displaying the UI as changed according to the user input.

\* \* \* \* \*